US011905987B2

(12) United States Patent
Berrell et al.

(10) Patent No.: US 11,905,987 B2
(45) Date of Patent: Feb. 20, 2024

(54) SECURITY DEVICE

(71) Applicants: Ian Patrick Berrell, Berlin (DE); Susanne Dorusz, Berlin (DE)

(72) Inventors: Ian Patrick Berrell, Berlin (DE); Susanne Dorusz, Berlin (DE)

(73) Assignee: HEXLOX UG (DE)

( * ) Notice: Subject to any disclaimer, the term of this patent is extended or adjusted under 35 U.S.C. 154(b) by 439 days.

(21) Appl. No.: 17/334,967

(22) Filed: May 31, 2021

(65) Prior Publication Data
US 2021/0388863 A1 Dec. 16, 2021

Related U.S. Application Data

(63) Continuation-in-part of application No. 15/755,109, filed on Feb. 26, 2018, now Pat. No. 11,022,167.

(51) Int. Cl.
*F16B 41/00* (2006.01)
(52) U.S. Cl.
CPC ............ *F16B 41/005* (2013.01); *F16B 41/00* (2013.01)
(58) Field of Classification Search
CPC ........ F16B 23/00; F16B 23/003; F16B 37/14; F16B 41/00; F16B 41/005; Y10S 411/91; Y10S 411/919
USPC .......... 411/372.5–372.26, 402–403, 429–431
See application file for complete search history.

(56) References Cited

U.S. PATENT DOCUMENTS

| | | |
|---|---|---|
| 3,273,442 A | 9/1966 | Launay |
| 3,302,672 A | 2/1967 | Walton |
| 3,405,595 A | 10/1968 | Peterson |
| 4,242,932 A | 1/1981 | Barmore |
| 4,870,842 A | 10/1989 | Plumer |

(Continued)

FOREIGN PATENT DOCUMENTS

| | | |
|---|---|---|
| DE | 19902192 | 7/2000 |
| EP | 1491777 | 12/2004 |

(Continued)

OTHER PUBLICATIONS

Hexlox Demo—Hexlox.com—facebook.com/thehexlox [Viewed on internet on Oct. 10, 2016], <URL:https://www.youtube.com/watch'? v=K-E57JYWbC8>, Published on Jan. 14, 2016.

(Continued)

*Primary Examiner* — Roberta S Delisle
(74) *Attorney, Agent, or Firm* — Galbreath Law Offices, P.C.; John A. Galbreath

(57) ABSTRACT

A security plug (10) adapted to be inserted into the female socket (18) of a fastener (20) to prevent a tool, such as an Allen key, engaging in the female socket. The plug (10) has an outer surface (22) complementary to the female socket (18) and a retaining member (14) that retains the plug (10) in the female socket (18), and at least one removal portion (26, 70) adapted to be engaged by a second tool (100), whereby engagement of the second tool (100) and the plug (10) allows forces applied by the second tool (100) to the plug (10) to withdraw the plug from the female socket against the action of the retaining member. The second tool and the removal portion (26, 70) may have complementary self-holding tapers and the retaining member (14) may be a magnet or one or more biased members that engage side walls(s) of the female socket.

27 Claims, 18 Drawing Sheets

(56) References Cited

U.S. PATENT DOCUMENTS

| | | | |
|---|---|---|---|
| 5,027,628 A | 7/1991 | De Rocher | |
| 5,097,686 A | 3/1992 | Plumer | |
| 6,641,343 B1 | 11/2003 | Duran | |
| 7,162,939 B2 | 1/2007 | Totsu | |
| 7,775,754 B2 | 8/2010 | Calandra | |
| 8,540,756 B2 | 9/2013 | Olsen | |
| 2002/0029596 A1 | 3/2002 | Tallarico | |
| 2004/0228703 A1 | 11/2004 | Such | |
| 2012/0165107 A1 | 6/2012 | Guo | |
| 2017/0234358 A1* | 8/2017 | Bielecki | F16B 39/28 411/429 |
| 2019/0154074 A1* | 5/2019 | Berrell | F16B 41/005 |
| 2023/0056188 A1* | 2/2023 | Lambert | F16B 41/005 |

FOREIGN PATENT DOCUMENTS

| | | |
|---|---|---|
| GB | 2189303 | 10/1987 |
| JP | H0814148 A | 1/1996 |

OTHER PUBLICATIONS

Hexlox—Incredibly Smart Bike Security [Viewed on internet on Oct. 10, 2016] <URL:http://www.bicycles.net.au/20 I 6/03/hexlox-incredibly-smart-bike-security/>, Published on Mar. 17, 2016.
Hexlox offers simple security for your components with theft proof magnetic plug [Viewed on internet on Oct. 10, 2016], <URL:http:/!www.bikerumor.com/20 1 6/03/22/hexlox-offers-simple-security-for-your-components-with-clever-magnetic-plug?>, Published on Mar. 22, 2016.

\* cited by examiner

SECURITY DEVICE

FIELD OF INVENTION

This invention relates to security plugs and more particularly to devices that attaches to the head of a bolt to prevent the bolt being loosened. More particularly it relates to devices that engage within a female recess on a bolt. However, the invention is not limited to use with only bolts and/or female recesses.

BACKGROUND

Security deterrents exist for nuts and bolts but require either a special new bolt or require removal of the bolt and a security cap to be mounted on the bolt and the bolt reinserted. The present invention aims to provide a security plug that can be attached to a bolt or nut in situ without the need for removal of the nut or bolt.

SUMMARY OF THE INVENTION

In one broad form the invention provides a security plug for a fastener having a female socket adapted to receive a first tool, the plug adapted to be inserted into the female socket to prevent the first tool engaging in the female socket, the plug comprising:
  an outer surface complementary to the female socket;
  at least one retaining member for retaining the plug in the female socket, and
  at least one first surface adapted to be engaged by a second tool having at least one second surface complementary to the at least one first surface, whereby engagement of the at least one first and second surfaces provides engagement between the second tool and the plug to allow forces applied by the second tool to the plug to withdraw the plug from the female socket against the action of the at least one retaining member.

In another broad form the invention provides a security plug for a fastener having a female socket adapted to receive a first tool, the plug adapted to be inserted into the female socket to prevent the first tool engaging in the female socket, the plug comprising:
  an outer surface complementary to the female socket;
  at least one retaining member for retaining the plug in the female socket, and
  at least one removal portion adapted to be engaged by a second tool, whereby engagement of the second tool and the plug allows forces applied by the second tool to the plug to withdraw the plug from the female socket against the action of the retaining member.

The forces applied may be one or more of an axial force, a rotary force and a radial force.

The engagement of the first and second surfaces may be a mechanical engagement or may be a magnetic engagement.

The engagement of the at least one removal portion with the second tool may be a mechanical engagement or may be a magnetic engagement.

In preferred forms of the invention the engagement occurs by abutting the two components together so as to engage mechanically or magnetically.

The retaining member is preferably a magnet but may comprise a mechanical connection with the socket. For example, the retaining member may comprise at least one protrusion that engages the socket, preferably side wall(s) or the socket. The at least one protrusion may define at least part of at least one screw thread, whereby rotation of the plug by the second tool causes withdrawal of the plug.

The retaining member may comprise an expandable/contactable retaining member or assembly, whereby expansion/contraction moves at least one contact surface of the retaining member into engagement with the socket or out of engagement with the socket The retaining member may comprise a first part and a second part whereby rotation of the first part relative to the second part causes an increase in a dimension of the assembly.

The first surface is preferably a conical or frusto-conical. The first surface more preferably has a self-holding taper (also called a machine taper), such as a Morse taper or a Morse like taper or other self-holding taper, such as Brown Et Sharpe, Jacobs and Jarno type tapers.

With self-holding tapers, the male and female components wedge together and bind to each other without the need for a separate retainer to the extent that the forces applied in normal use do not cause the male and female components to separate.

As will become apparent from the description of embodiments of the invention, the taper and/or its diameter can vary between items, so that a removal tool designed for one plug will not necessarily engage correctly with another plug. As such the angle of the self-holding taper does not need to be an exact match to the various tapers provided by the various systems, such as Morse, Brown Et Sharpe, Jacobs and Jarno type tapers.

ISO 296:1991 is the current International Organization for Standardization standard that specifies the dimensions of self-holding tapers for tool shanks and provides further guidance to the types of tapers. ISO 296 relates to tool shanks and indicates appropriate tapers are about 4% to about 5%, i.e. about 1:25 to about 1:20.

Tapers are measured as the increase in diameter relative to length, so correspond to the included angle rather than an angle relative to the centreline A 4% taper corresponds to an included angle of about 2.29 degrees, or an angle relative to the centreline of about 1.145 degrees. A 5% taper corresponds to an included angle of about 2.86 degrees or an angle relative to the centreline of about 1.43 degrees. Jacobs tapers range from a minimum included angle of about 2.8 degrees up to about 4.6 degrees. Morse tapers typically have an included angle of about 3 degrees.

It should be noted that the ISO standard relates to tool shanks used in lathes, milling machines and other industrial machines that impart a rotary force to the tool whilst present invention relates to a security plug that is primarily subject to a tension force. As such the invention's requirements of the self-holding taper are different to the requirements of a tool shank and the range of acceptable tapers is not limited by the limits of ISO 296 or the various 'proprietary' tapers, such as Morse, Brown Et Sharpe, Jacobs and Jarno type tapers.

The included taper angle used in the invention may range from 1 degree through to 10 degrees. More preferably taper angle ranges from 1 to 6 degrees and even more preferably between 2 and 5 degrees.

The first surface may an inner surface or an outer surface.

The plug may include a tubular portion and the first surface may an inner surface of the tubular portion.

The first surface may have a free end and an inner end. The free end may have a diameter larger than the diameter of the inner end.

The plug may include one or more stop surfaces to limit the location of the second tool relative to the plug.

Where the first surface is defined at least in part by at least part of an inner surface of the tubular portion the plug may include at least one protrusion. The protrusion may extend axially along the tubular portion.

In a preferred embodiment the major portion of the protrusion comprises at least one of a conical and frusto-conical surface. Preferably the major portion comprises a frusto-conical surface and a conical surface extending from the frusto-conical surface but may comprise a conical surface. Where the major portion incudes a conical surface, preferably the point of the conical surface is located at, adjacent to or close to the open end.

The protrusion may be formed integrally with the first surface or may be formed as a separate component.

In one embodiment the plug comprises a shell defining the first surface, a recess having an opening and an inner end spaced from the opening, a spacer and a magnet located in the recess with the spacer sandwiched between the inner end and the magnet.

The plug may have a tubular portion with at least part of the inner surface defining the first surface The tubular portion preferably has an opening in an inner end. The spacer may include a protrusion that extends through the opening into the tubular portion.

The at least one retaining member may be at least one removal member.

In one embodiment the at least one retaining member includes at least two bar magnets with at least two of the at least two bar magnets arranged with opposite Poles adjacent to each other The at least two bar magnets may extend within the plug to expose, physically or magnetically, the other Poles to action by a removal tool.

In another broad form the invention provides a security plug for a fastener having a longitudinally extending female socket adapted to receive a first tool, the plug adapted to be inserted into the female socket to prevent the first tool engaging in the female socket, the plug comprising:
- an outer surface portion complementary to the female socket;
- at least one retaining member for retaining the plug in the female socket, and
- at least one removal portion comprising at least one first engagement surface adapted to be engaged by a second tool having at least one second engagement surface complementary to the at least one first engagement surface, whereby mechanical engagement of the at least one first and second engagement surfaces provides engagement between the second tool and the plug to allow force applied longitudinally by the second tool on the plug to withdraw the plug from the female socket against the action of the at least one retaining member,
- wherein at least one first engagement surface has a self-holding taper has an included taper angle between 1 and 10 degrees.

The self-holding taper may comprise a Morse taper, a Brown Et Sharpe taper, a Jacobs taper or a Jarno taper.

The self-holding taper may have an included taper angle between 1 and 6 degrees.

The self-holding taper may have an included taper angle between 2 and 5 degrees.

The first and second engagement surfaces may comprise a female engagement surface and the other of the first and second engagement surfaces comprises a male engagement surface adapted to be received within the female engagement surface and wherein, when the first and second engagement surfaces are engaged together, the male engagement surface expands the female engagement surface very slightly and the resulting compressive forces applied by the female engagement surface to the male engagement surface over the overlapping regions of male and female surfaces hold the security plug and the second tool together.

The plug may have first and second longitudinal ends and the at least one removal portion may be located at or adjacent the first longitudinal end and the at least one retaining member may be located at or adjacent the second longitudinal end, the plug adapted to be inserted into the female socket with the at least one retaining member engaging an inner end of the female socket or at least one side wall of the female socket.

The retainer may comprise at least one leg biased to engage the at least one side wall.

The at least one leg preferably extends outwardly toward the first longitudinal end but may extend outwardly toward the second longitudinal end The security plug may comprise at least one leg receiving recess for receiving the at least one leg.

The at least one leg may extend at an angle to the longitudinal direction of between 10 and 40 degrees, more preferably at between 20 and 30 degrees and most preferably at about 21 degrees.

The plug may be integrally formed with the retainer member. However, preferably the security plug comprises a shell and a separate retainer member connected to the shell.

The retainer member may be connected to the shell by at least one of adhesive, glue, bonding agent, weld, rivet, bolt, screw, interference fit pin, clip, circlip and biased arm(s).

The security plug of may comprise at least one securing member that engages the shell to secure the retaining member to the shell.

The at least one securing member may engages a peripheral surface of the shell.

The retainer member may comprise the at least one securing member.

The retainer member and the at least one securing member may be separate components.

The at least one securing member may pass through the retainer member to engage the shell and secure the retainer member to the shell.

The shell may comprise at least one further recess or bore and the at least one securing member may be received in the at least one further recess or bore.

The at least one further recess or bore and the at least one securing member may have complementary threads and the at least one securing member may screw into the shell.

The at least one further recess or bore and the at least one securing member may be an interference fit.

The security plug may comprise at least one longitudinally extending first recess comprising said at least one first engagement surface and the at least one further recess or bore may extend to the first recess.

Where the at least one further recess or bore extends to the first recess the corresponding at least one securing member may extending into the first recess.

The at least one further recess or bore may be a blind bore.

The security plug may comprise at least one head and the retaining member may be sandwiched between the shell and the at least one head.

The at least one head may be integral with the at least one securing member.

The at least one head may engage the at least one securing member.

The at least one head may comprise a clip, including a circlip.

The individual features set out above may be combined in any combination, as appropriate The invention also provides the combination of a plug as set out above and a second tool having a second surface complementary to the first surface of the plug.

DETAILED DESCRIPTION OF PREFERRED AND OTHER EMBODIMENTS

Figure 1:
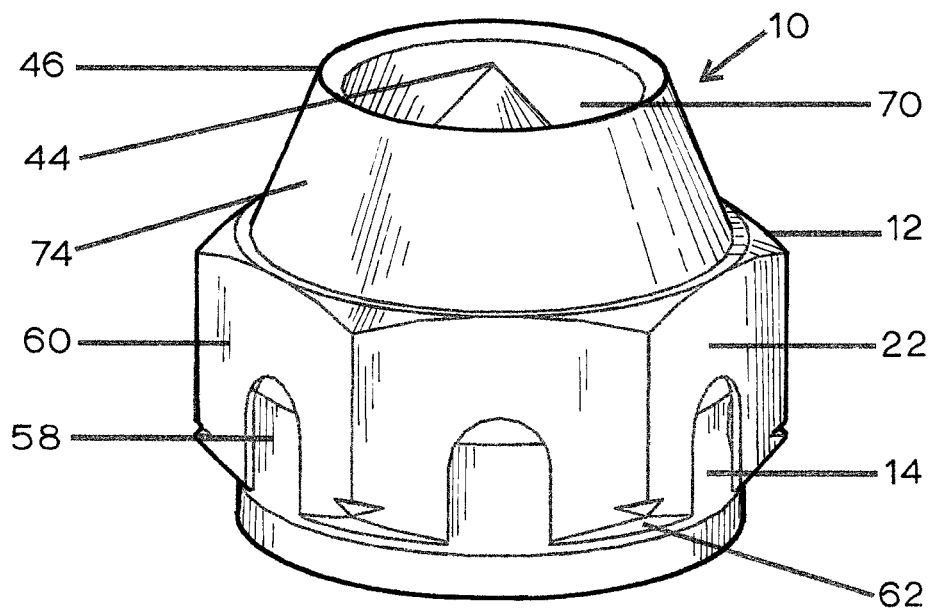
FIG. 1 is perspective view of a security plug according to a first embodiment of the invention.
Figure 2:
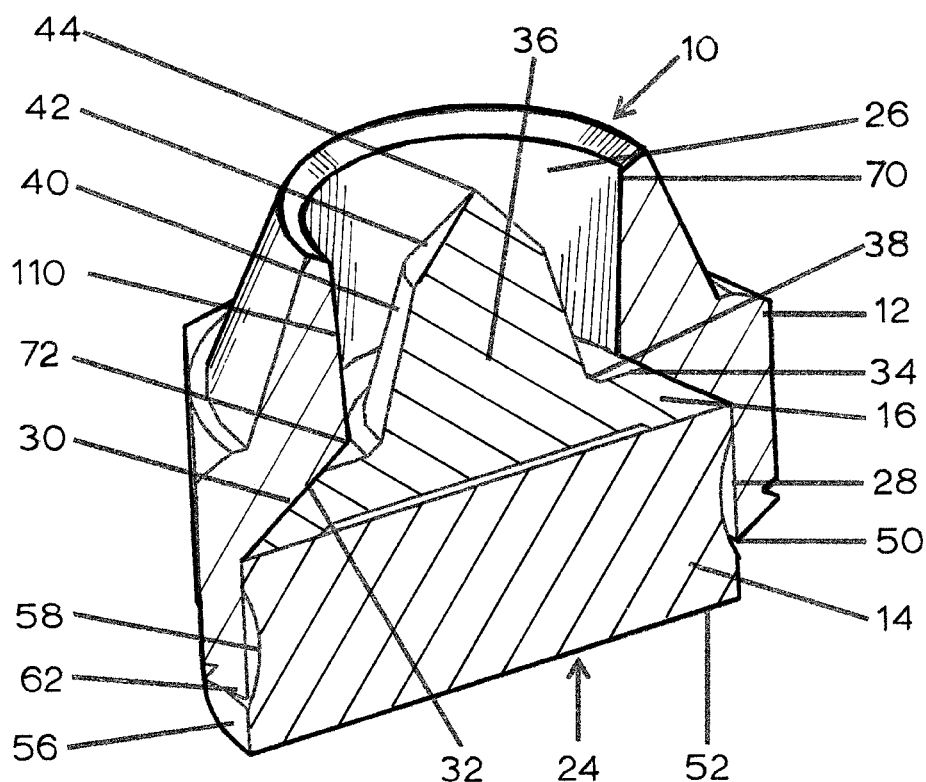
FIG. 2 is a cross sectional perspective view of the security plug of FIG. 1.

Referring to FIGS. 1 to 6 there is shown a security plug 10 according to an embodiment of the invention.

The plug 10 is comprised of a shell 12, a magnet 14 and spike member 16. The spike member 16 is optional but provides additional security features. The shell 12 and spike member 16 are preferably nonmagnetic and may be formed of stainless steel, titanium or any other suitable material.

The plug 10 of this embodiment is intended to be inserted into a female hexagonal Allen key socket 18 of bolt 20 and to be a snug fit in the socket 18.

Accordingly the shell 12 has a hexagonal peripheral surface 22 corresponding to the hexagonal shape of the socket 18.

The invention is not limited to use on hexagonal Allen key systems and may be used with other fastening systems, such as, but not limited to those having a star shaped recesses, usually of 6 points, with and without centre pins, other polygonal systems, typically having four or five faces, with and without centre pins or any suitable socket shape. Accordingly the external peripheral surface 22 may be modified to match the intended female socket.

The shell 12 has a lower recess 24 which receives the central spike member 16 and magnet 14 and an upper recess 26. In the embodiment shown the lower recess 24 has, in plan view, a cylindrical surface 28 with a constant diameter but surface 28 need not be circular or of constant cross sectional shape.

A frusto-conical surface 30 extends from the surface 28 to upper recess 26.

The central spike member 16 has a corresponding frusto-conical surface 32. If desired surfaces 30 and 32 may be of other shapes. For example, surface 30 may be a planar radially extending surface.

Surface 30 extends radially inwards more than surface 32 but this is not critical. If desired surface 30 may extend radially inwards as much as surface 30 or more.

Central spike member 16 has an annular surface 34 extending radially inwards from surface 32 and central spike 36 extends into upper recess 26 toward open end 34. Central spike 36 has transition surface 38, a first frusto-conical surface 40 and conical surface 42, which ends at point 44. Point 44 is near to the plane of open end 46 so as to prevent insertion of a tool other than a suitable tool into the upper recess 26. The point 44 may be flush with or slightly recessed relative to the open end 46 but preferably does not extend beyond the plane.

If desired the central spike need not have separate surfaces 40 and 42 but have one surface or more than two surfaces. Whilst the surfaces 40 and 42, in cross section, are planar, this is not critical and, if desired, they may comprise a revolution of a curved line. Use of a surface that is not a constant distance from the axis prevents gripping by pliers or the like and the like; application of compressive forces will drive the gripping tool towards the point 44.

The magnet 14 is secured to the shell and/or the central spike member 16 by various mechanical methods, such as by one or more of gluing or crimping or other suitable methods.

In the embodiment shown the magnet 14 extends downwards beyond the lower edge 50 of the shell. This is not critical and the base 52 of the magnet may be flush with the lower edge 50.

Depending on the shape of the base 54 of the female socket the base 52 of the magnet may have a non-planar surface. Some fasteners include a central pin that extends from the base 52 toward the open end 18 and, accordingly, the magnet may have a central recess or aperture. If necessary the central spike member 16 may also have a recess or aperture to receive such a pin. Where such a recess or aperture is provided it need not be a snug fit with the central pin.

The side wall 56 of the magnet 14 may be provided with a circumferential recess 58 to allow for adhesive between the magnet and shell 12 and/or for crimping of the shell 12 to the magnet 14. This recess 30 is not critical and may be omitted. If desired a series of axially extending slots or groves may be provided in either one or both of the magnet and shell for receiving adhesive.

In the embodiment shown the shell 12 has a series of legs 60 whose ends 62 overlie the recess 58 and are spaced from the recess, so allowing for crimping.

Figure 21:
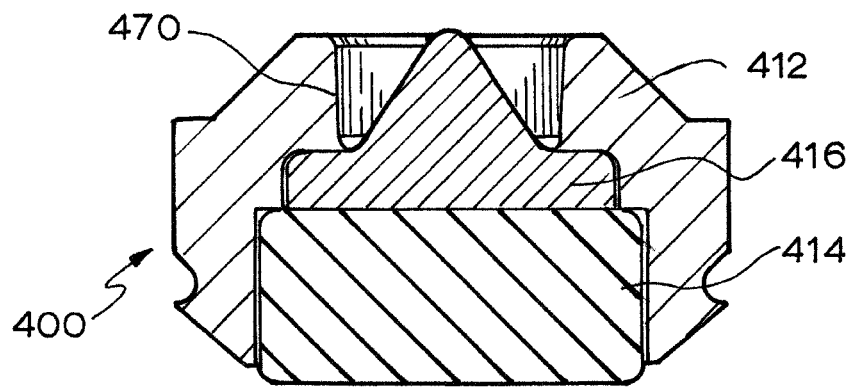
FIG. 21 is perspective view of a security plug according to another embodiment of the invention.
Figure 22:
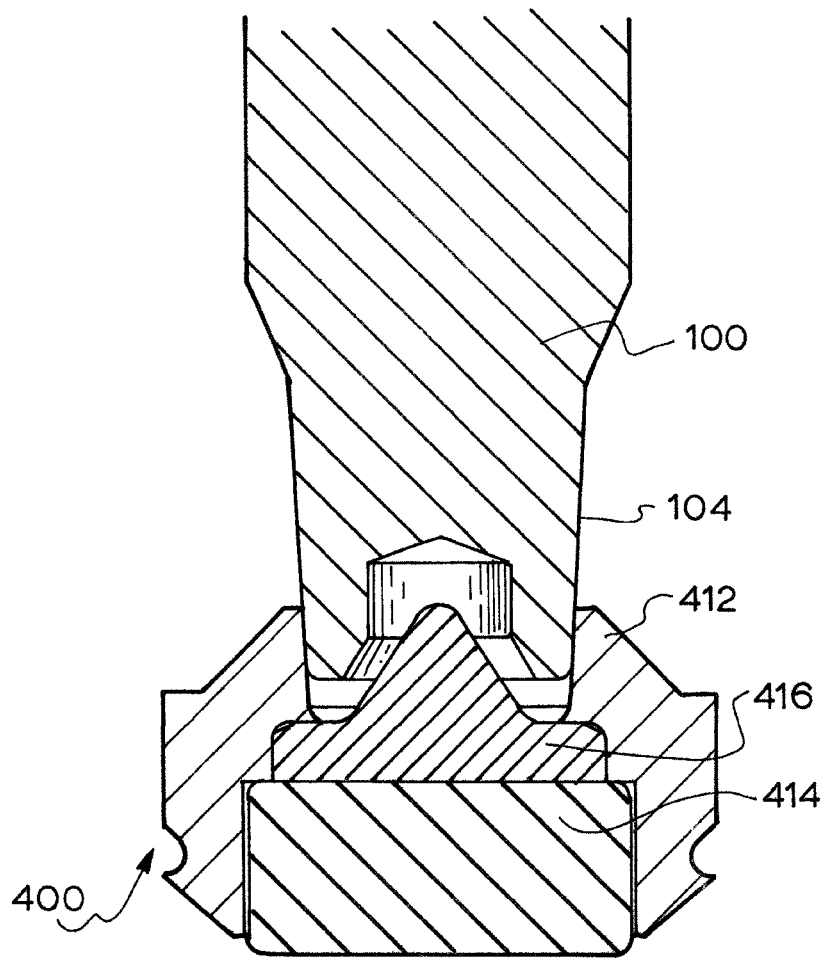
FIG. 22 is cross sectional view of the security plug of FIG. 21.
Figure 24:
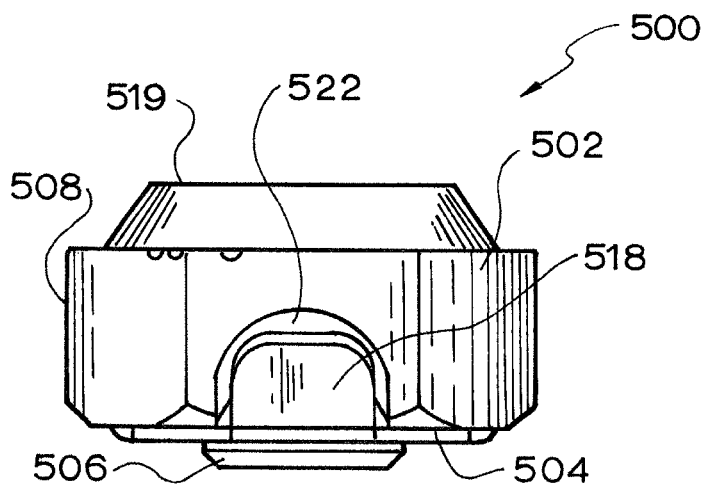
FIG. 24 is a first side view of the security plug of FIG. 23.
Figure 25:
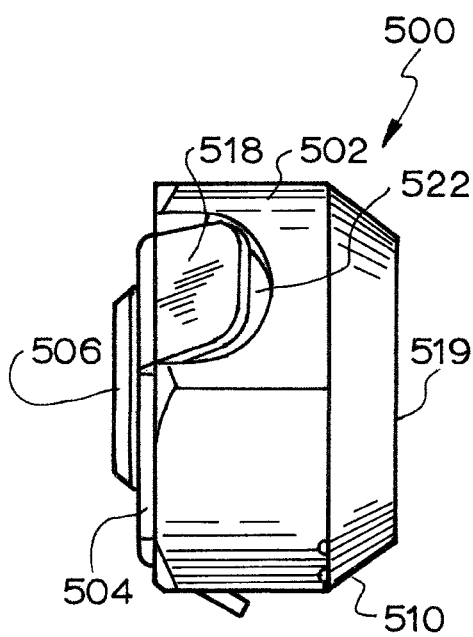
FIG. 25 is a second side view of the security plug of FIG. 23.
Figure 23:
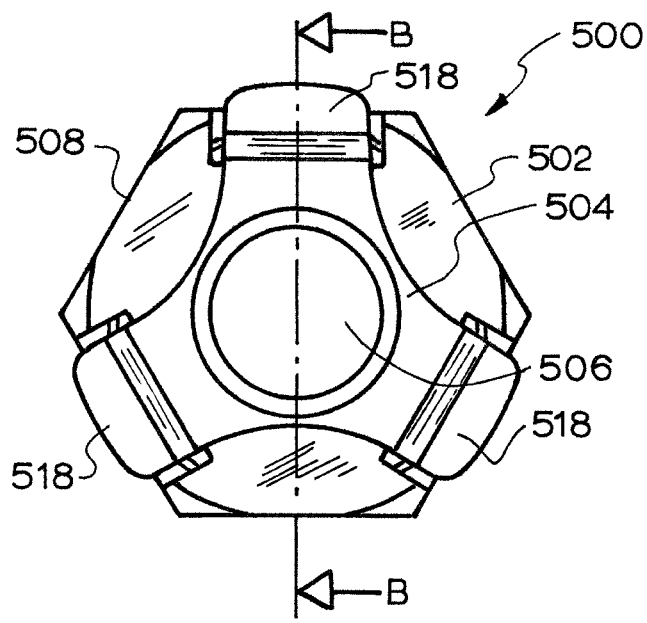
FIG. 23 is a plan view from above of a security plug according to another embodiment of the invention.
Figure 26:
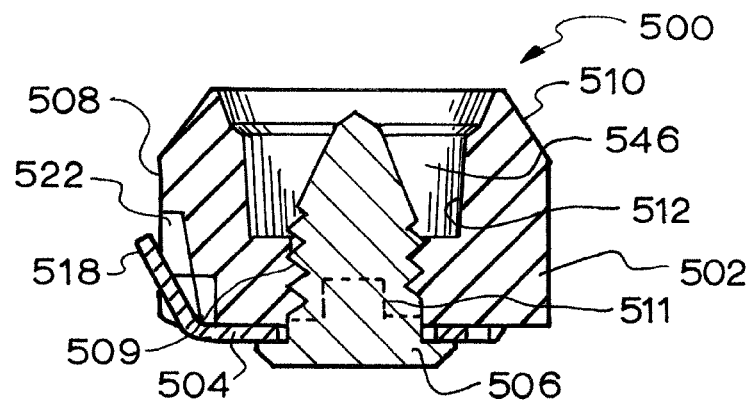
FIG. 26 is a cross sectional side view of the security plug of FIG. 23, taken along line BB of FIG. 23.
Figure 27:
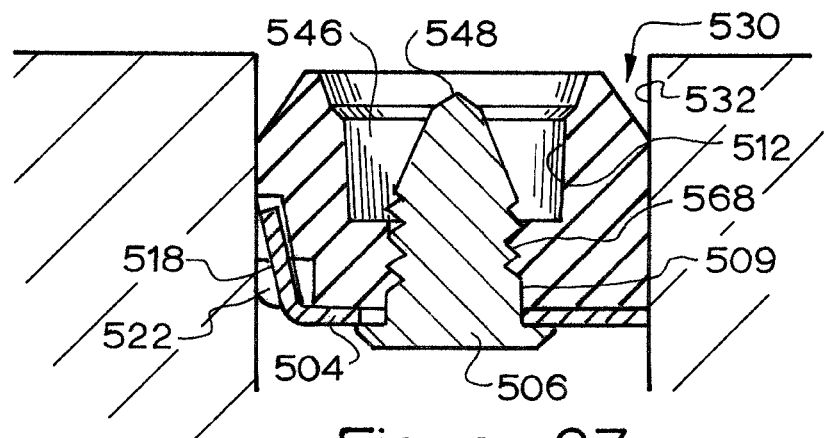
FIG. 27 is a cross sectional side view of the security plug of FIG. 23 installed in a recess.

The bending of the legs 60 is insignificant to the fit of the shell in the female socket 18. The legs 60 are not essential and the shell may be formed with a continuous surface, as seen in FIGS. 21 and 22. This is achieved by using a magnet having a smaller diameter relative to the shell.

The upper recess 26 has a frusto-conical inner surface 70 that is a tapered inwards and downwards toward magnet 14. This surface 70 is preferably a Morse taper or similar to a Morse taper but other self-holding tapers may be used, such as such as Brown Et Sharpe, Jacobs and Jarno type tapers or tapers with similar tapers to the aforementioned. In the embodiment shown the angle to the centreline is about 1.5 degrees (i.e. in cross section an included angle of about 3 degrees) but may be more or less. An included angle between 1 and 10 degrees may be used, more preferably the included angle is in the range of 1 to 6 degrees.

The lower end 72 of the surface 70 has a larger diameter than the lower end of surface 40 and/or transition wall 38 and so a gap exists between lower end 52 and spike 36.

A conical wall surface 74 extends upwards and inwards from above the hexagonal outer surface 22.

Figure 3:
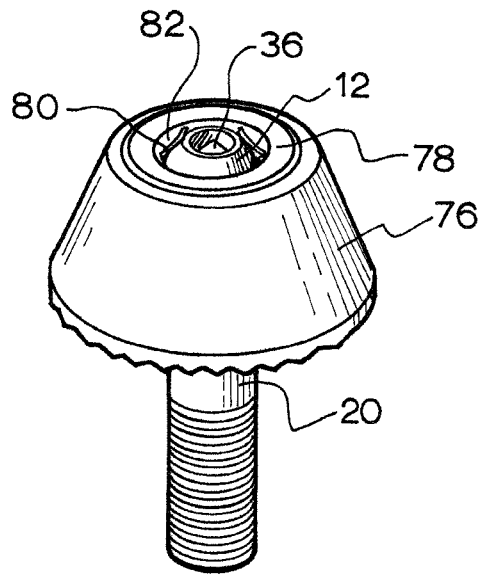
FIG. 3 is a perspective view of the security plug of FIG. 1 installed in a bolt with a female Allen key socket.

In use the security plug 10 is merely inserted into the female socket 18 of the bolt, after the bolt has been installed and tightened. For existing installations there is no need to remove or loosen the bolt. In FIG. 3 onwards the bolt 20 is shown located in an additional security sleeve 76 that prevents gripping of the external surface of the bolt 20. The sleeve 76 is not part of the present invention.

The overall height of the plug 10 is such that when fully inserted into socket 18 the plug extends at least to the end 80 of the female hexagonal socket and more preferably toward the free end 78 of the bolt. Most bolts with female sockets tend to have a conical wall surface 82 surrounding the female socket to aid centering of the relevant tool into the female socket.

Figure 4:
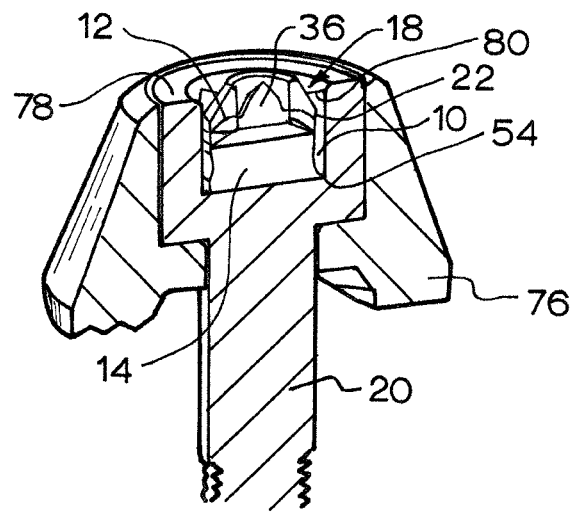
FIG. 4 is a cross sectional perspective view of the security plug and bolt of FIG. 3.
Figure 5:
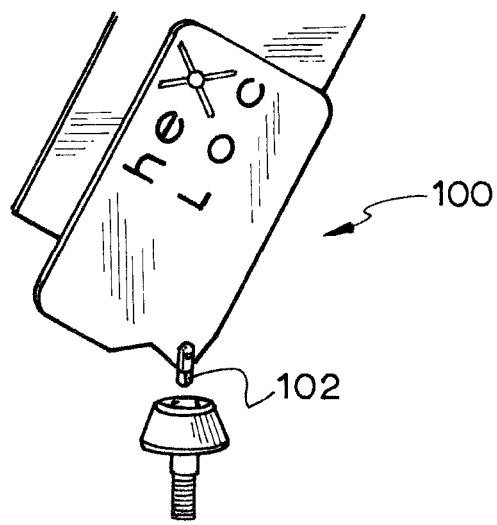
FIG. 5 is a perspective view of the security plug of FIG. 1 installed in a bolt with a female Allen key socket and a removal tool.
Figure 6:
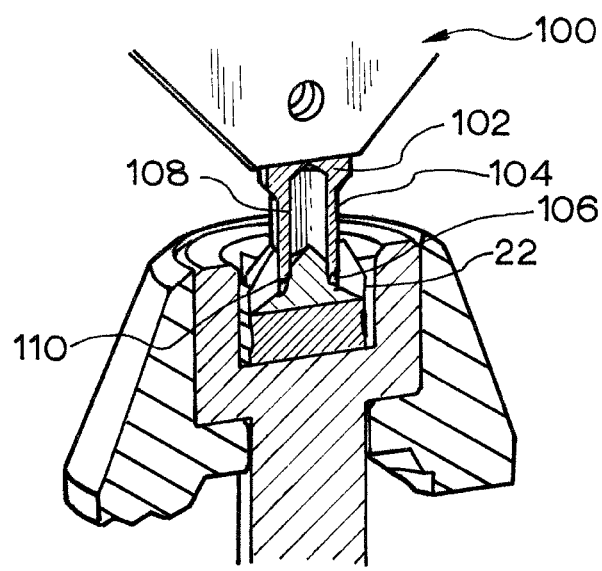
FIG. 6 is a perspective view of the security plug of FIG. 1 installed in a bolt with a female Allen key socket with a removal tool engaged with the plug.
Figure 7:
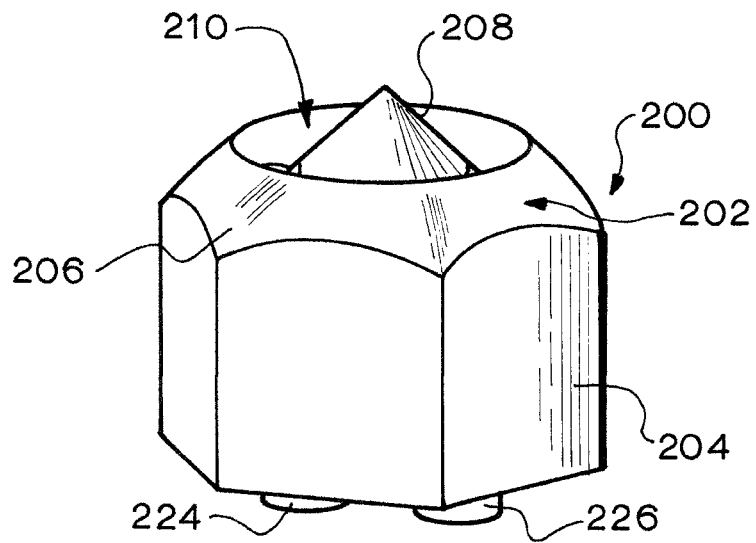
FIG. 7 is perspective view from above of a security plug according to a second embodiment of the invention.
Figure 8:
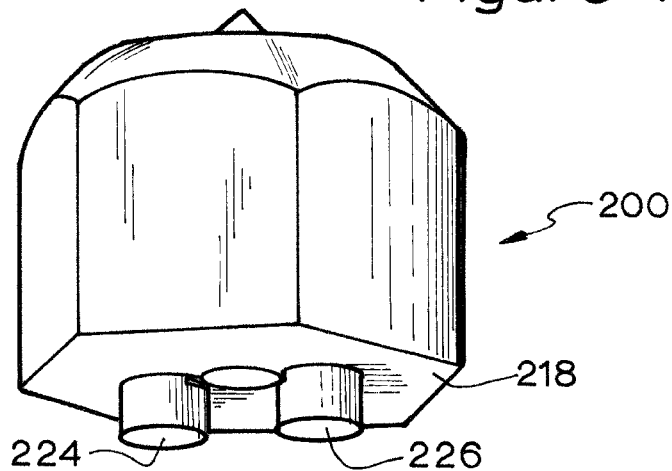
FIG. 8 is perspective view from below of the security plug of FIG. 7.
Figure 9:
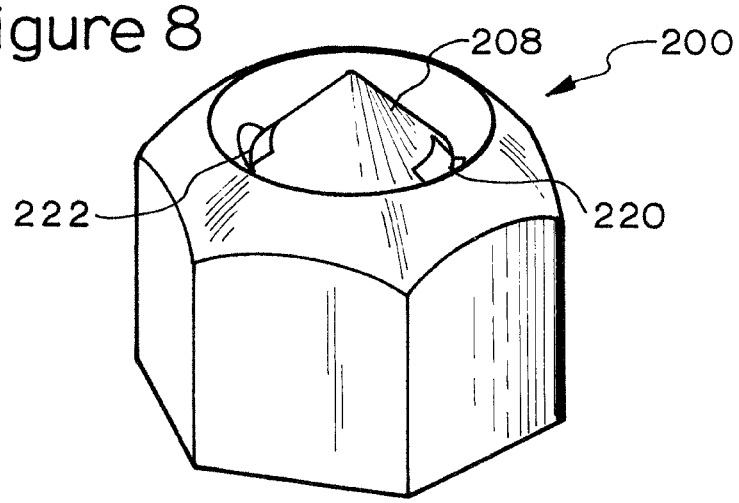
FIG. 9 is a different perspective view from above of the security plug of FIG. 7.
Figure 10:
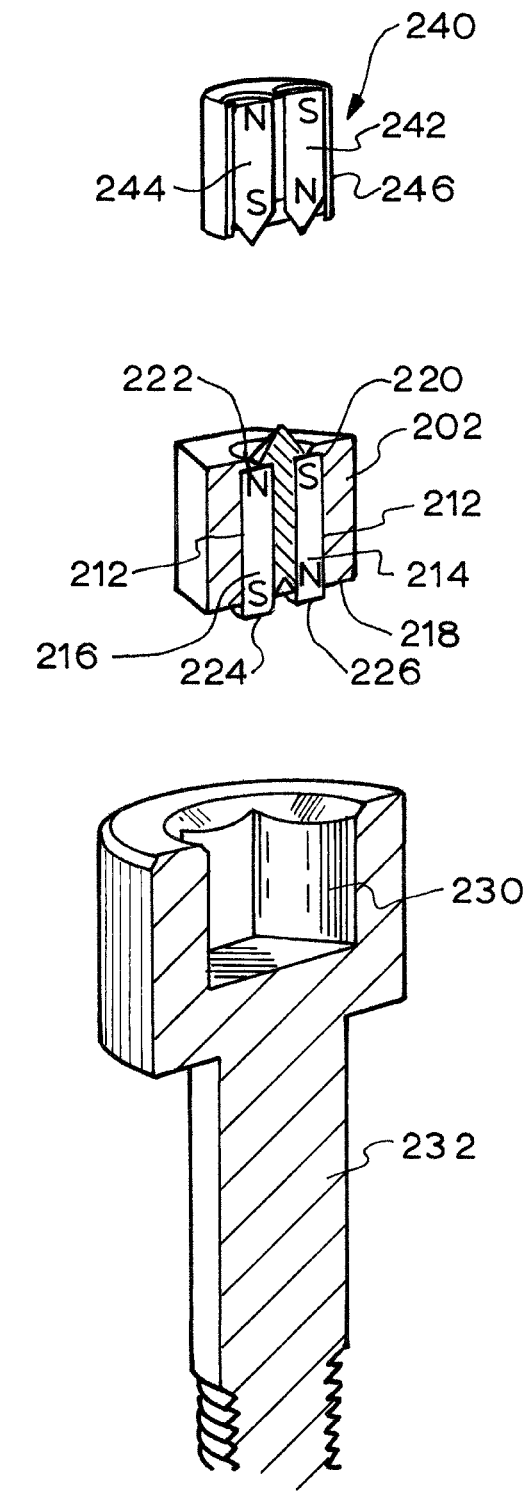
FIG. 10 is an exploded perspective cross sectional view of the security plug of FIG. 7, a bolt with which it is used and a removal tool.
Figure 11:
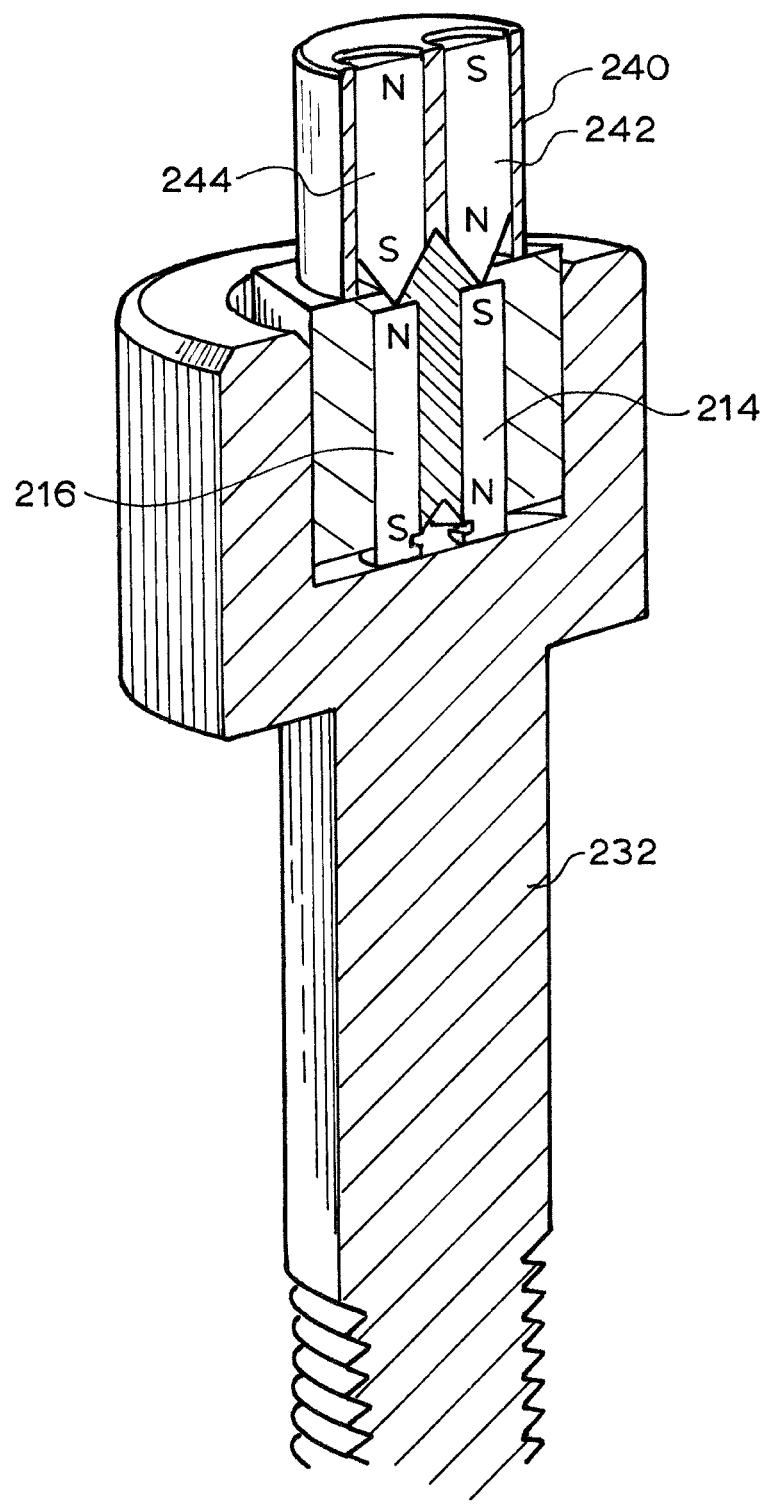
FIG. 11 is an perspective cross sectional view of the security plug of FIG. 7, in the bolt with which it is used and a removal tool.

As seen in FIGS. 4 and 6 the hexagonal outer surface 22 does not extend the full height of the female socket 18. This is to accommodate bolts with different depth female sockets as it is preferred that, when installed, the hexagonal outer surface 22 is located within the female socket and does not extend out of the female socket at all or only insignificantly. If a significant portion of the hexagonal outer surface 22 extended out of the female socket 18 this would provide a non-circular surface that could be gripped to turn the bolt 20.

The outer conical surface 74 blocks access to the exposed portions of the female socket 18 and prevents engagement by a hexagonal tool.

When inserted into the female socket 18 the magnet 14 holds the plug 10 in the bolt 20 through magnetic attraction with the bolt 20. As such the plug will not fall out of the socket 18 during normal use and, because it does not present any easily gripped surfaces, cannot be easily pulled out of the socket without an appropriate tool.

Once inserted into the female socket the plug is then held securely within the socket.

To remove the plug a complementary tool 100 is required. The tool has a tubular member 102 with a conical outer surface 104 tapered to a smaller diameter at free end 106. The outer surface 104 has the same taper as surface 70. The inner surface 108 of the tubular member 102 merely needs to have a large enough size to allow insertion of the tubular member 102 into the upper recess 26 and engagement by outer surface 104 with the surface 70 before it engages the surfaces of central spike 36. The inner surface 108 may be a cylindrical bore.

In use the tubular member 102 is inserted into the recess 26. The outer diameter of the free end 106 is the same as the diameter of surface 70 at a location 110 between its inner and outer ends. Thus the tubular member 102 may be inserted until free end 106 reaches location 110. At this position the surfaces 70 and 104, because have the same taper, engage over their entire overlapping regions. A small downwards pressure forces the surfaces 70 and 104 into intimate contact. As with such taper connections the male surface 104 expands the female surface 70 very slightly and the resulting compressive forces applied by the female surface 70 to the male surface 104 hold the two components together.

The amount of overlap of the surfaces 70 and 104 is chosen to provide sufficient "grip" to overcome the magnet 14 and any striction/friction between the hexagonal wall surfaces 22 and socket 18.

The user may then apply an outwards pull on the tubular member 100 to withdraw the plug 10 from the socket 18. The socket 18 is then free to be accessed by a suitable tool.

The plug thus allows for the bolt to be directly loosened or tightened by its complementary tool without being blocked by the plug.

As mentioned, the inner diameter 108 is sized so that there is clearance between it and the central spike 36 and so there is no interaction with the central spike.

A self-holding taper (also called a machine taper), such as a Morse taper or a Morse like taper or other self-holding taper, such as Brown Et Sharpe, Jacobs and Jarno type taper have tapers usually of about 4% to 5% but include tapers up to about 10% (about 6 degrees included angle) or more.

A Morse taper has a taper that is approximately ⅝ inch per foot, approximately one in twenty. Different "standard" Morse tapers have slight variations on this taper. As mentioned, the taper used is a Morse taper or like a Morse taper but need not be a standard Morse taper. The reason is that plugs according to the invention will be made with different taper angles and different diameters for location 110, so as to provide more than one combination of plug 10 and tool 100.

The invention is not limited to the specific tapers of these 'proprietary' tapers, due to the need for variability and is not limited to the upper or lower bounds of these tapers.

When comparing two different sets of male and female pairs that have different taper percentages (or angles), the pair with the smaller taper percent will hold to each other more strongly that the pair with the larger taper percent. It will be appreciated that the taper angles used will be chosen to provide sufficient engagement of the tool with the plug to remove it from the socket.

The tubular portion 102 of a tool 100 will only engage in a recess 26 with the same taper and will not engage securely (if at all) in a socket with a different taper. Providing a range of tapers means that any one tool is less likely to fit a random socket.

Similarly, providing different diameters also prevents tools with the same taper being used in different size sockets. A first tool which has the same taper angle as a second tool designed for a use with a recess 26 but a free end 106 with a diameter larger than the second tool will engage the surface 70 nearer to the open end than the second tool. Accordingly, the amount of overlap and consequential gripping between plug 10 and tool will be less. Below a certain threshold, that gripping function will not allow the plug 10 to be removed. A tool with the same taper angle but a smaller diameter free end 106 may be inserted further into the recess 26 but the annular surface and/or spike surfaces will limit inwards movement and prevent the tapered surfaces engaging whatsoever. Choosing a location 110 near to the inner end of the surface 70 limits the scope to use tools with a smaller diameter free end 106.

FIGS. 7 to 13 show a security plug 200 according to a second embodiment of the invention. The plug 200 comprises a shell 202 with a similar outer shape to plug 10 of the first embodiment. The plug has hexagonal side surface 204 and conical upper surface 206. A central conical spike 208 extends upwards in recess 210. The shell 202 includes two bores 212 in which are located two bar magnets 214 and 216. The bar magnets extend out of the base 218 of shell 202 and are preferably shaped so that their upper ends 220 and 222 are flush with the surface formed by the recess 210 and central spike 208.

The two bar magnets 214 and 216 are arranged so that adjacent ends have opposite Poles. Thus, lower end 224 of magnet 216 may be a South Pole with lower end 226 of magnet 214 will be a North Pole, whilst ends 222 and 220 will be North and South Poles.

Plug is sized to fit into socket 230 of bolt 232 and be retained within the socket by the magnetic attraction of the two magnets 214 and 216.

Figure 12:
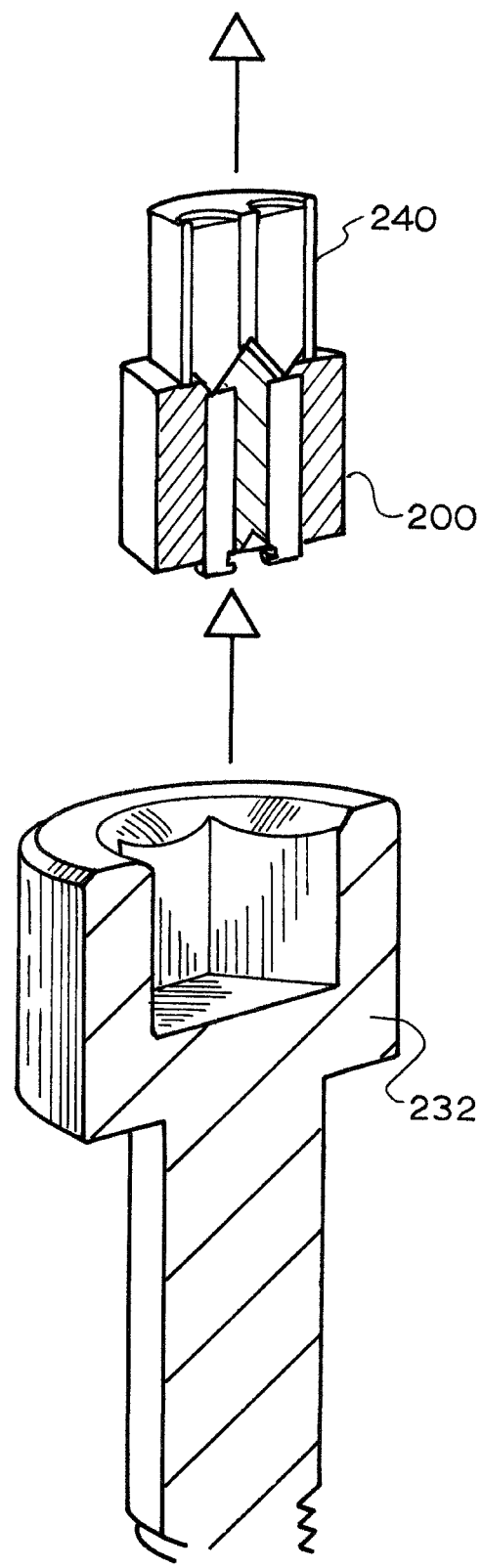
FIG. 12 is an perspective cross sectional view of the security plug of FIG. 7 connected to its removal tool after removal from the bolt with which it is used.

Removal of the plug requires a tool 240 that includes two bar magnets 242 and 244 with opposite poles at their lower end located in support member 246. The lower end of tool 240 is complementary to the upper end of plug 200 so that it may be placed on the plug with the magnets 242 and 244 aligned with the magnets 214 and 216 in plug 200. The attraction between the four magnets is greater than the attraction between magnets 214 and 216 and the bolt 232 and so the user may withdraw the plug from the socket 230 merely by pulling the tool 240 away from bolt 232, as shown in FIG. 12.

Use of magnets with opposite polarity prevents removal by a single magnet.

Figure 13:
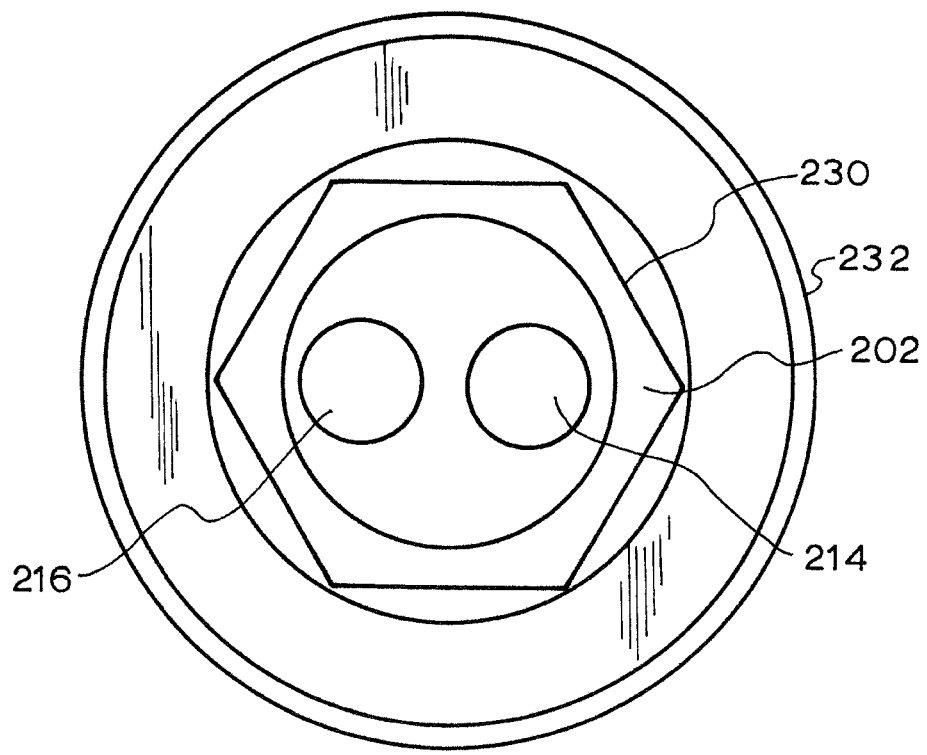
FIG. 13 is a plan view from above of the security plug of FIG. 7 in the bolt with which it is used.
Figure 14:
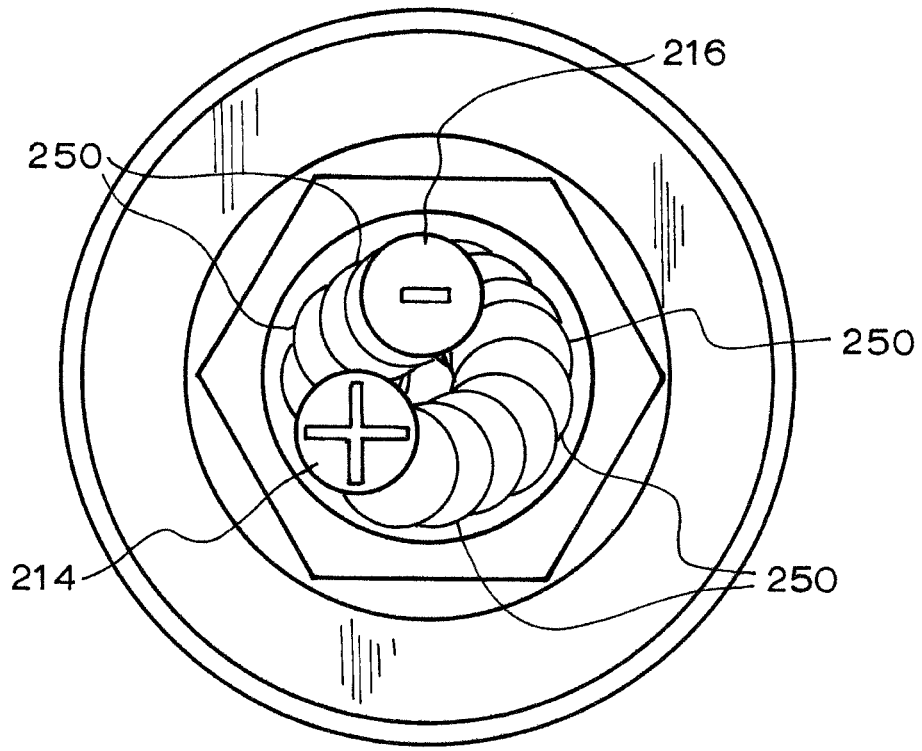
FIG. 14 is a plan view from above of the security plug of FIG. 7 in the bolt with which it is used showing potential alternative relative locations of retaining members.
Figure 15:
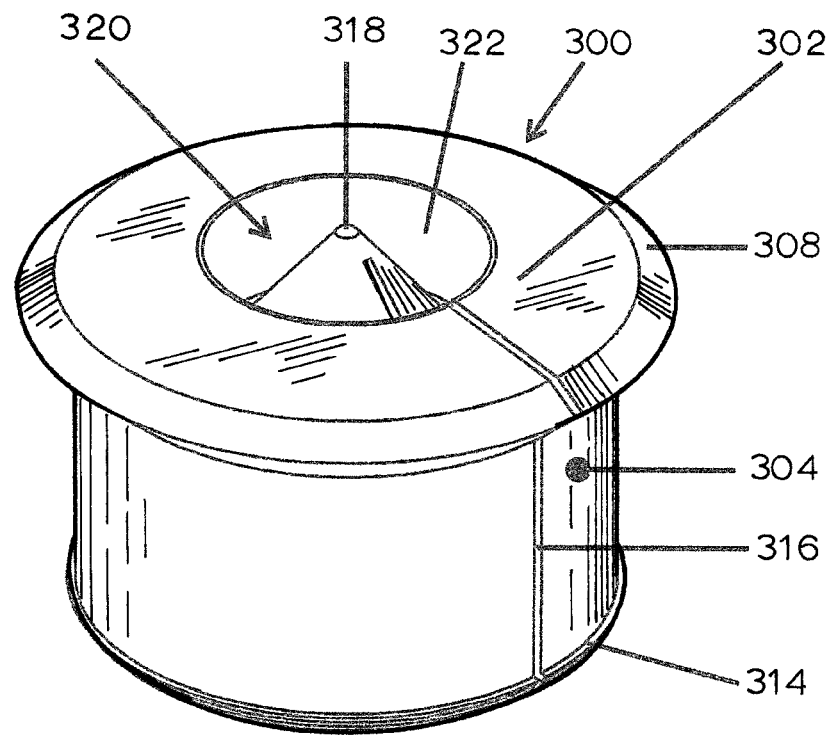
FIG. 15 is perspective view of a security plug according to a third embodiment of the invention.

FIG. 13 shows a plan view of the plug 200 in the bolt 232 and with magnets 214 and 216 arranged diametrically opposite to each other. However, as indicated in FIG. 14, the two magnets need not be located diametrically opposite to each other and may be located at random positions, as indicated by part circles 250. Whilst circles 250 are shown lying on the same radius, the two magnets need not be located at the same radial distance from the centreline.

Providing the magnets at locations other than diametrically opposite to each other provides for a significant number of combinations and requires a matching removal tool 240.

Whilst the embodiment shown has two magnets three or more magnets may be used, which further increases the number of possible combinations.

FIGS. 15 to 20 show a security plug 300 according to a third embodiment of the invention.

The security plug 300 comprises a shell 302 with a plug portion 304 with a circular outer surface 306 and a cap portion 308 that extends radially more than the base portion 304.

The diameter of plug portion 304 is sized to fit within socket 310 of bolt 312. Cap portion 308 limits the depth of insertion of plug into socket 310.

Plug portion 304 includes at least one protrusion 314. Whilst protrusion 314 is shown in the drawing as a simple circle it may be part of a screw thread. Protrusion 314 need not be a single continuous protrusion and there may be a series of protrusions, lying on one or more circular or spiral paths. Protrusion 314 is an interference fit with the socket and so bites into the surface of the socket and holds the plug in the socket.

The plug 300 may include a slot 316 that allows the plug to contract slightly as it is inserted into socket and so provide outward directed force to the protrusion(s).

Figure 16:
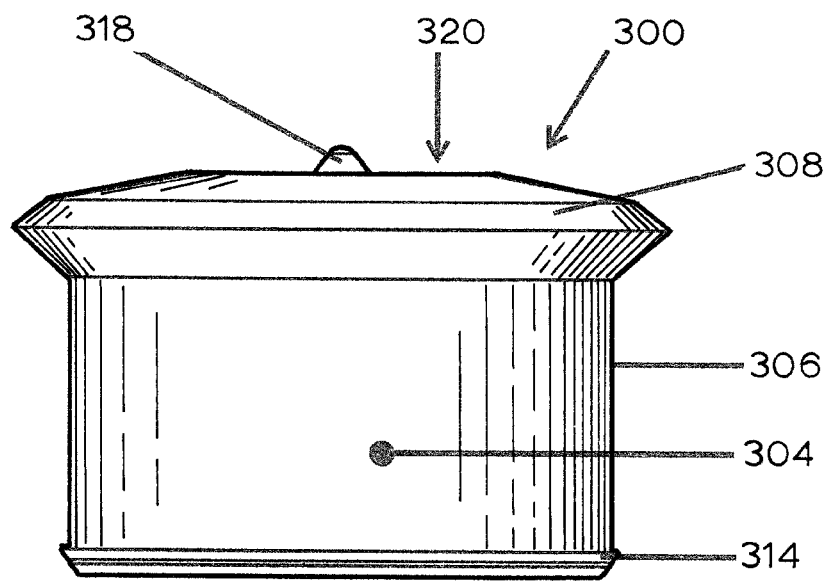
FIG. 16 is a side view of the security plug of FIG. 15.
Figure 18:
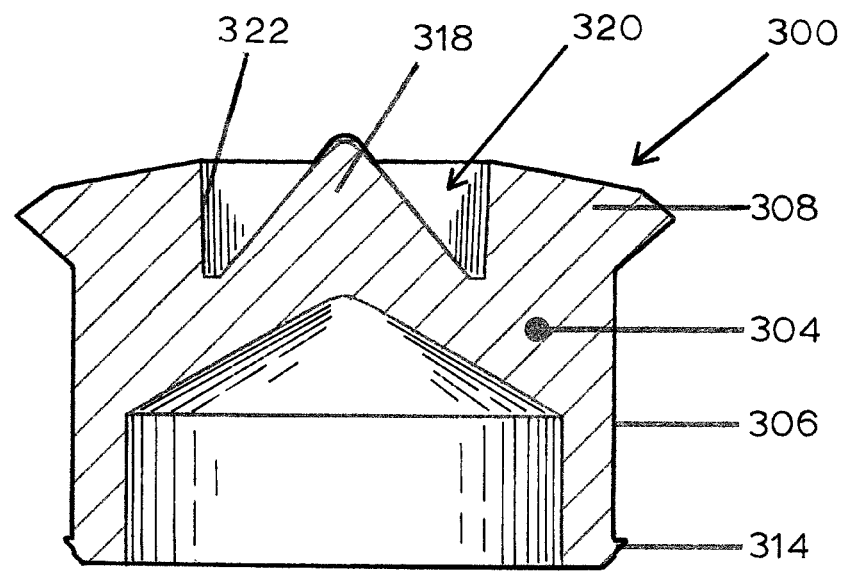
FIG. 18 is a side cross sectional view of the security plug of FIG. 15.
Figure 17:
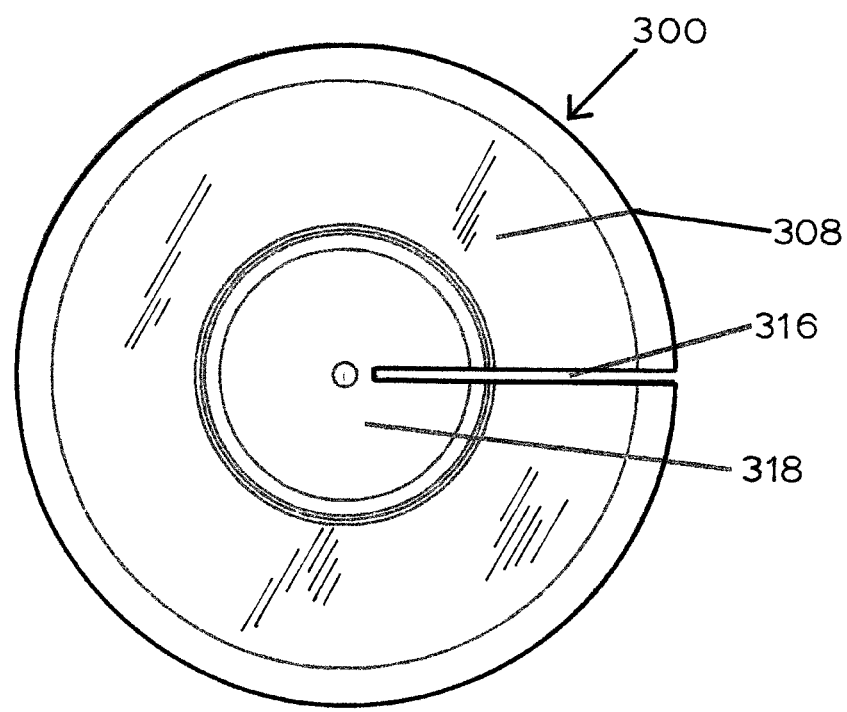
FIG. 17 is a plan view from above of the security plug of FIG. 15.
Figure 19:
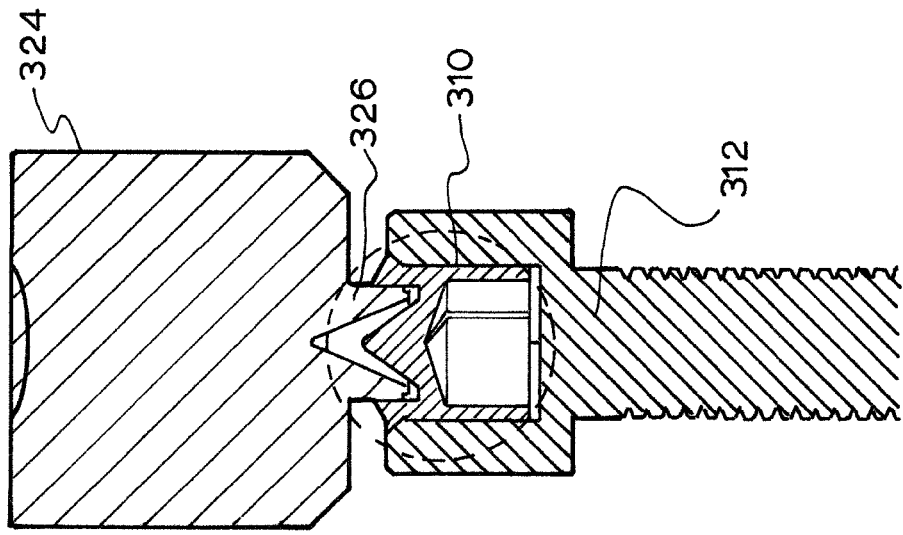
FIG. 19 is a side cross sectional view of the security plug of FIG. 15 installed in a bolt and engaged with a removal tool.
Figure 20:
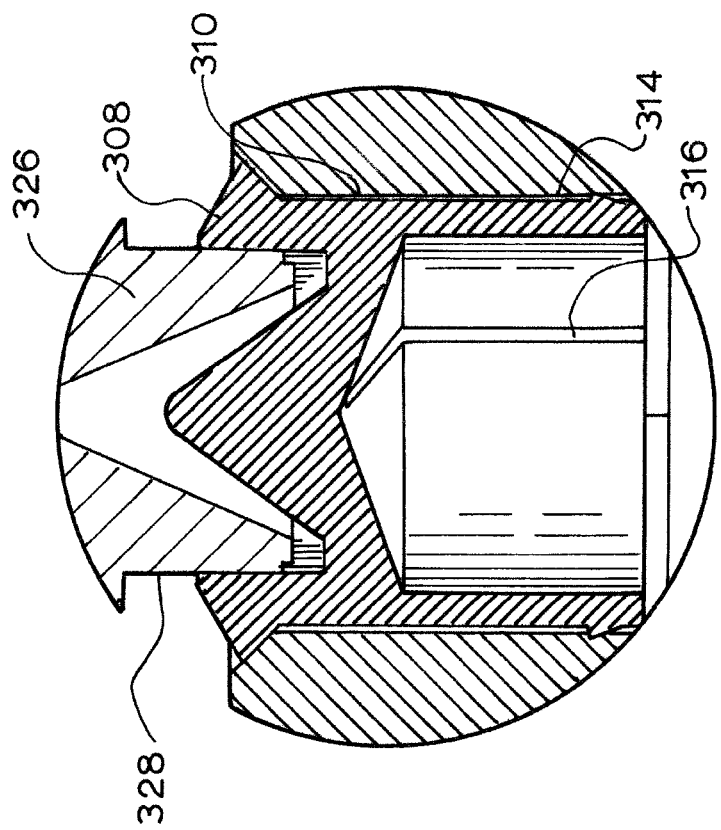
FIG. 20 is a detail view of part of FIG. 19.

Plug 300 includes upper recess 320 and central protrusion 318 that, as best seen in FIGS. 16 and 18 extends above the top of cap portion 308. The plug may be driven into the socket by hammering or otherwise impacting on central protrusion 318.

The surface 322 of recess 320 has a Morse taper or Morse like taper, in a similar manner to the first embodiment. A tool 342 with a tubular portion 326 having an outer surface 328 with a Morse taper or Morse like taper complementary to surface 322.

On insertion of the tool into plug 300 the user may use the tool to withdraw the plug 300 from the socket. Where the protrusion(s) 314 define at least one screw thread this may require rotary motion to be applied to the plug, either alone or in combination with an axial pulling motion. Otherwise, a simple pulling motion may suffice. The variations of the tapered surface described in relation to the first embodiment are equally applicable to this embodiment.

FIGS. 21 and 22 show a security plug 400 according to another embodiment of the invention. The plug is substantially similar to the plug 10 of the first embodiment and functions in substantially the same manner.

The plug 400 is comprised of a shell 412, a magnet 414 and spike member 416.

The shell 412 has recess 470 with a Morse taper that engages with outer surface 104 of tool 100 that has a complementary Morse taper.

The plug 400 differs from plug 10 in that the magnet 414 and spike member 416 each have proportionally smaller diameter compared to the shell 412.

Accordingly the shell 412 has a continuous hexagonal peripheral surface 422 and lower recess 424 may be a cylindrical bore. In this embodiment the magnet does not have a circumferential recess corresponding to recess 58 of the plug 10. Instead the magnet 414 and spike member 416 are retained using other methods. The magnet 414 and optionally the spike member 416 may be an interference fit in the recess 424. Alternatively or in addition the magnet and optionally the spike member 416 may be retained using glue or adhesive. It will be appreciated that if the magnet 414 is securely retained in the recess 424 the spike member 416 is also retained.

FIGS. 23 to 32 show a security plug 500 according to a further embodiment of the invention. This embodiment is designed for use with non-magnetic fasteners, but may be used with magnetic fasteners.

The plug 500 is comprised of a shell 502, a retaining member 504 and a securing member 506. The securing member 506 secures the retaining member 504 to the shell 502.

The plug 500 of this embodiment is intended to be inserted into a female hexagonal Allen key socket and it is preferred that it be a snug fit in the socket. Accordingly, the shell 500 has a hexagonal peripheral surface 508 corresponding to the hexagonal shape of the proposed socket. As with all of the other embodiments the peripheral surface 508 is not required to be hexagonal and may be any other shape, whether it is circular or non-circular, suitable for the socket that it will be inserted into. It will be appreciated that as the purpose is to prevent insertion of a removal tool into the socket that the plug merely needs to block sufficient of the socket to prevent removal using the wall(s) of the socket.

As with the other embodiments the shell 502 preferably includes a conical outer surface 510 that in use prevents or limits gripping of the shell, such as by a pair of pliers or similar. As with the other embodiments the conical outer surface 510 is not obligatory.

The shell includes a conical inner surface 512 that has a taper or slope so as to self-holding with an appropriate male element with a corresponding taper. When engaged by an appropriate male component the self-holding action allows the plug to be withdrawn from the socket, in a similar manner as described for the other embodiments.

In contrast to the embodiments that utilise a magnet to retain the plug in the socket the retaining member 504 of the plug 500 is a sprung member. The retaining member 504 comprises a base 514 with an aperture 516 through which the securing member 506 passes and three legs 518 located equidistant form each other extending radially outward from the base 514 and upwards toward the top 519 of the shell. The securing member 506 engages in a recess, bore or passageway 509 in the shell 502. The angle 520 of legs 518 relative to the base 514 is preferably about 61 degrees but may be between 50 and 70 degrees, more preferably between 56 and 66 degrees to the base 514. The shell has corresponding recesses 522 to accommodate the legs 518. The ends 524 of the legs extend beyond the peripheral surface 508. When the plug 500 is inserted into a female recess or socket 530, the legs 518 are bent or deflected inwards so as to lie within the recesses 522, which are sized to accommodate this inwards movement of the legs 518. The material of the retainer 504 and the dimensions of the legs 518 are chosen so that the legs 518 may be deflected elastically into the recesses 522. The currently preferred material is spring stainless steel X10CrNi18-8. The upward angling of the legs 518 causes the wall(s) 532 of the recess 530 to compress the legs 518 inwards as the plug 500 is inserted into the recess 530.

The legs 518 are deflected inwards elastically and so when in the socket the legs 518 are biased against the wall(s) 532 of the socket 530 and serve to resist removal of the plug 500 from the socket 530.

There may be more or less than three legs 518. A single leg may be used but at least two legs are preferred.

Figure 28:
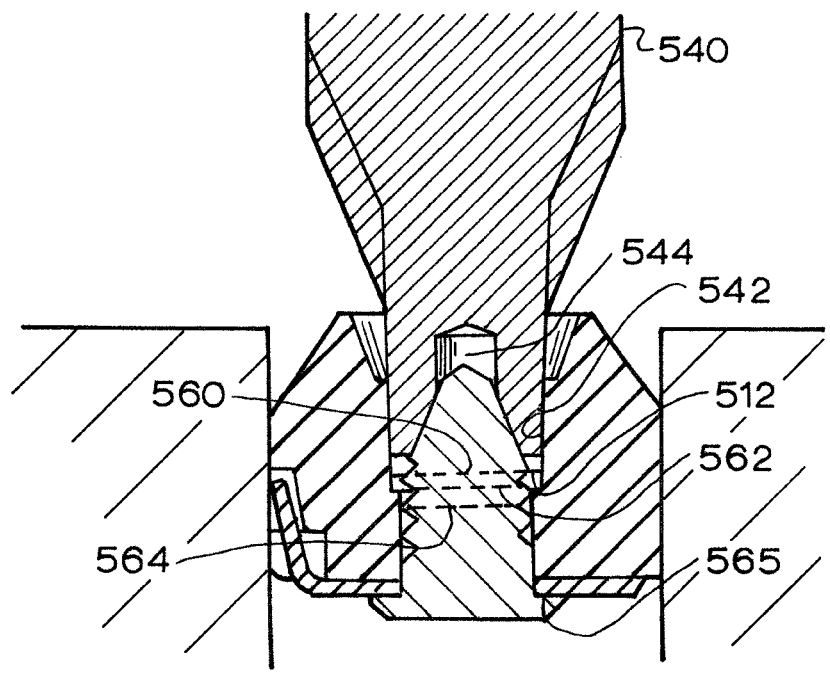
FIG. 28 is a cross sectional side view of the security plug of FIG. 23 installed in a recess and engaged by a removal tool.
Figure 31:
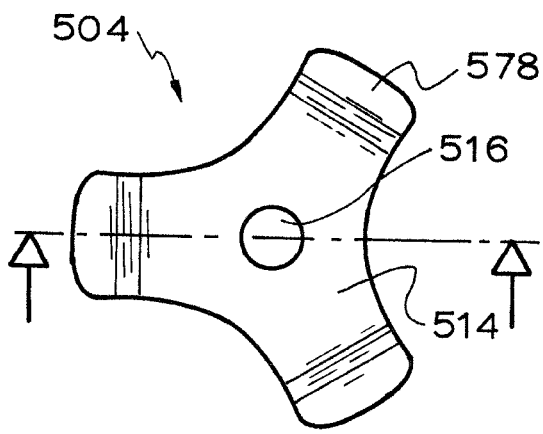
FIG. 31 is plan view of the retainer member of the embodiment of FIG. 23.
Figure 30:
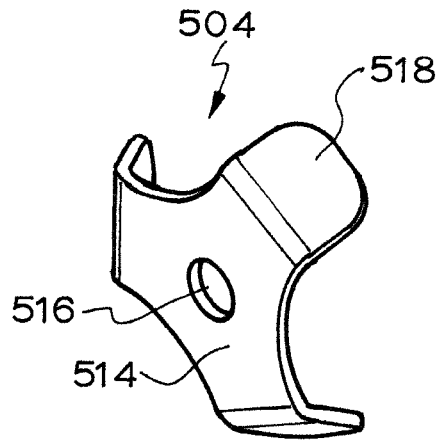
FIG. 30 is a second perspective view of the retainer member of the embodiment of FIG. 23.
Figure 29:
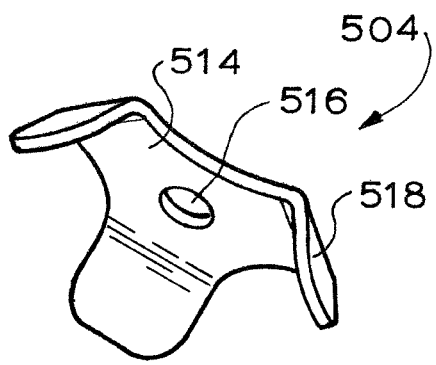
FIG. 29 is a first perspective view of a retainer member of the embodiment of FIG. 23.

As with the other embodiment's removal of the plug 500 requires use of a complementary tool, 540, shown in FIG. 28.

The tool 540 has an outer tapered surface 542 that is complementary to the tapered surface 512 of the shell. The tool 540 is inserted into the shell 502 so that the surfaces 512 and 542 engage each other in a self-holding engagement. Retraction of the tool away from the socket then draws the plug 500 out of the socket, against the resistance provided by the legs engaging the wall(s) of the socket.

It will be appreciated that the tension that may be applied from the tool 540 to the plug 500 via the self-holding engagement of the surfaces 512 and 542 needs to be greater than the resistance provided by the shell 502 in general together with the resistance provided by the legs 518. Thus the taper angle and its length in turn depend on the materials of the socket and the legs 528 as well as the dimensions of the legs 528.

In the embodiment shown in FIGS. 23 to 32 the securing member 506 extends into the recess 546 defined by the tapered surface 512. Accordingly, the tool 540 is provided with a recess 544 to accommodate the end 548 of the securing member 506. This also provides an additional level of security as a tool without a suitable recess 554 will not be able to be inserted into the self-holding recess 546 whatsoever or insufficiently to provide sufficient engagement between the self-holding engagement surfaces.

The location of part of the securing member 506 in the self-holding engagement recess 546 to block a tool with an appropriate self-holding surface is not essential and, for example, the securing member 506 may extend:
  into self-holding engagement recess but below where the tool would engage, as indicted by line 560;
  extend to the bottom of the base of the self-holding engagement recess, as indicated by line 562, or
  only extend part way along passageway 509, as indicated by line 564.

Where the securing member 506 does not extend fully along the aperture 509 the aperture may be blind, so that the securing member 506 cannot be accessed via the self-holding recess 546.

In the embodiment of FIGS. 23 to 28 the securing member 506 comprises a head 565 and an elongate and at least partially a threaded section 566 that engages with a complementary thread 568 in the shell 502. In the embodiment shown the retainer member 504 has a circular aperture 516 through which the section 566 passes and the section 566 has a circular cross section adjacent the head 565. As such the securing member 506 may rotate relative to the retainer member 504. A suitable thread locking compound may be utilised to prevent rotation of the shell relative to the securing member 506.

The retainer member 504 may be provided with a non-circular aperture and securing member 506 with a corresponding non-circular portion that engages in the retainer member 504, so as to prevent rotation of the pin relative to the retainer member. Where the securing member 506 screws into the shell 502 the retainer member 504 may be formed flat, so that the securing member 506 and retainer member 504 may be rotated relative to the shell 502 and the legs 518 then bent into position in the recesses 524.

Use of a screw in securing member or even a separate securing member is not essential to the invention in its broadest form.

Figure 33:
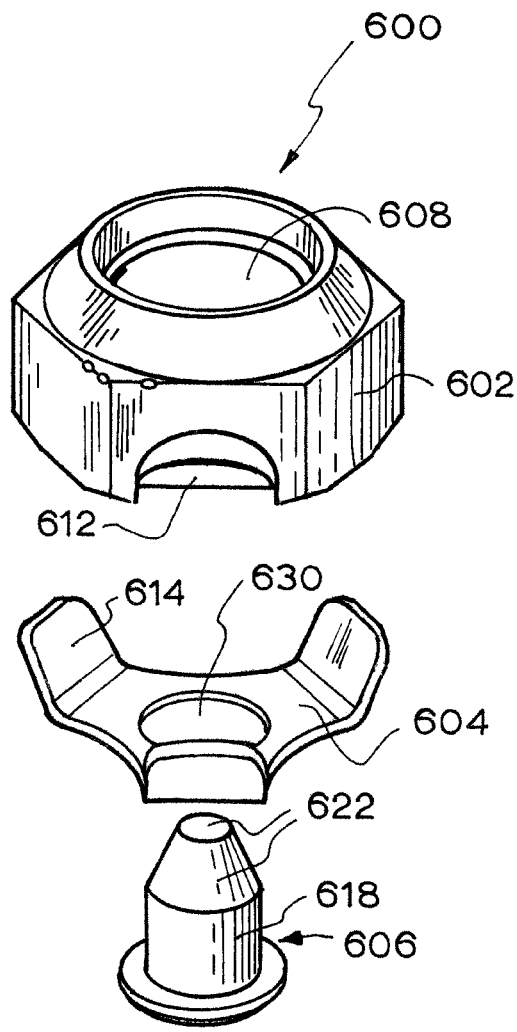
FIG. 33 is first perspective view of a security plug according to another embodiment of the invention.
Figure 34:
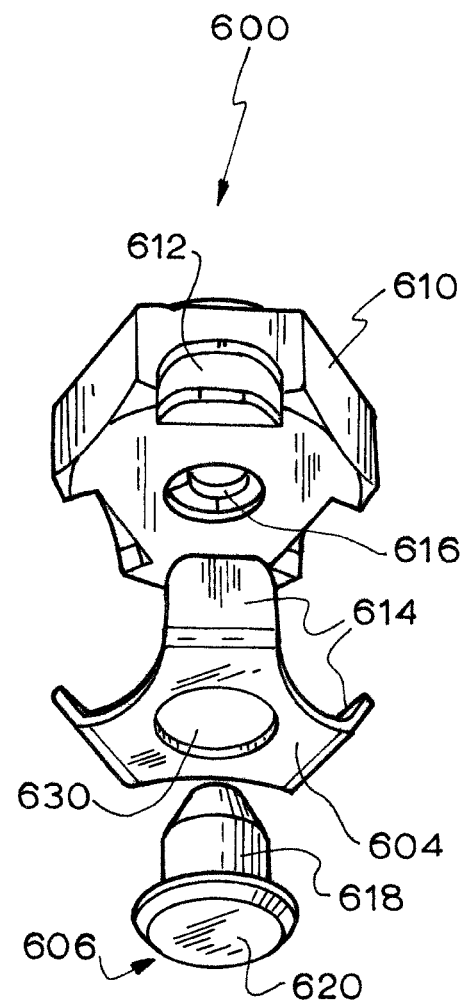
FIG. 34 is second perspective view of a security plug according to another embodiment of the invention.

FIGS. 33 and 34 show a security plug 600 according to a further embodiment of the invention. The plug 600 is similar to the plug of the embodiment of FIGS. 23 to 32 and comprises a shell 602, retainer member 604 and securing member 606. The shell 602 and retainer member 604 are substantially as the embodiment of FIGS. 23 to 28, with self-holding tapered surface 608, hexagonal outer surface 510 and recesses 612 to accommodate legs 614 of retainer member 604. securing member 606 passes through aperture 630 in retainer member 604 and into passageway 616 in the shell 602, trapping the retainer member 604 between the head 620 of securing member 606 and the shell 602 Where the plug 600 differs from plug 500 is that the aperture 616 in shell 602 is not threaded and the section 618 of securing member 606 is also not threaded. Instead the securing member 606 is an interference press fit into the shell 602. By providing a sufficiently 'tight' press fit the securing member 606 may be, in effect, permanently secured into the shell 602. A suitable high strength bonding agent may also optionally applied to further secure the securing member 606 in the shell 602. As an alternative to being an interference press fit the securing member 606 may be merely secured in the aperture 616 by a suitable glue, adhesive or other bonding agent.

In the embodiment shown the aperture 616 extends from the base of the shell 602 through to self-holding recess 608 and the securing member 606 is of a length to extend into the self-holding recess. As with the other embodiments the end of the securing member 606 may be provided with one or more conical surfaces 622 at its end region. The aperture 616 and securing member 606 may be modified in a similar manner to the embodiment of FIGS. 23 to 32.

Figures and show a security pug 700 according to a further embodiment of the invention, comprising a shell 702, retainer member 704 and securing member 706. The retainer member 704 is similar to the retainer members 502 and 602 and the shell has a similar self-holding tapered surface 708, hexagonal outer surface 710 and recesses 712 to accommodate legs 714 of retainer member 704.

In this embodiment the securing member 706 is configured as a deformable rivet to hold the shell 702 and retainer member 704 together.

The shell 702 differs in that the aperture 716 in shell 702 is neither threaded nor configured to be an interference fit with the securing member 706.

Instead the aperture comprises first and second portions 718 and 720 with different diameters, so as to define an annular surface 722 at their junction.

The securing member 706 comprises a first and second portion 724 and 726 that define an annular surface 728 at their junction. The annular surfaces 722 and 728 overlap an, once assembled, prevent movement of the securing member 706 toward the base 730 of the shell.

The securing member 706 is provided with a third portion 730 that does not have the head but is initially a cylindrical portion sized to extend through the aperture 734 in the retainer member 704. The securing member 706 is passed into the shell 502 from end 736 and through the retainer member 704. Whilst the shell 702 and retainer member 704 are held together the end of the third portion 732 is deformed to form the head 738 and hold the three components together.

Figure 37:
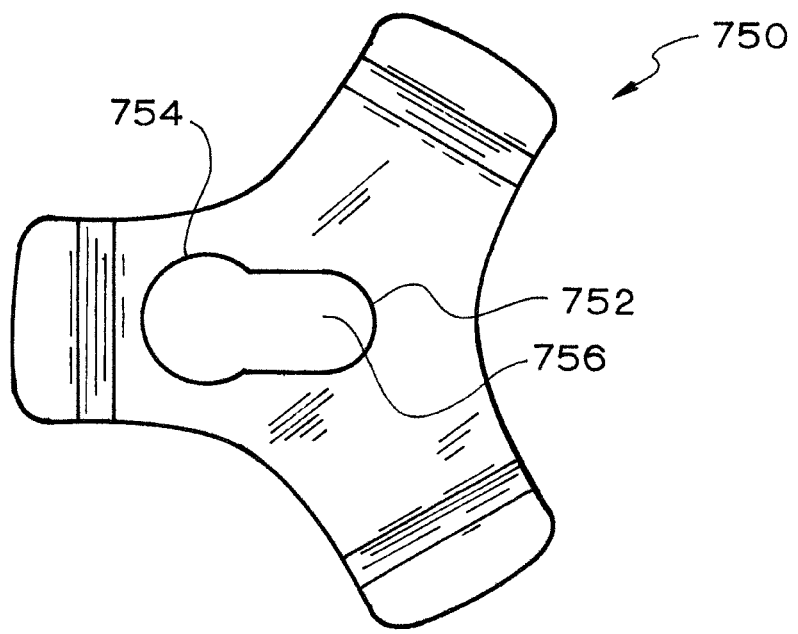
FIG. 37 is plan view of a retainer member according to another embodiment of the invention.

As an alternative to forming a rivet in situ the securing member 706 may be formed with a head, as shown in the drawings and, referring to FIG. 37, a securing member 750 may be provided with an offset keyhole type aperture 752 having a larger portion 754 sized to allow the head 738 to pass through and a smaller portion 756 that is smaller than the head but larger than the shaft portion 732. The retaining member may be mounted on the securing member and slid sideways into position, with one or more legs deflected to allow this, until the retaining member is secured, at which point the deflected leg(s) return to their un deflected state in the recesses of the shell.

As a further variation the retaining member may be provided with a circular aperture larger than the head and a separate circlip or other retainer may be located between the head and the securing member. Alternatively the head may be omitted and a separate circlip or other retainer would perform the function of the head.

The central protrusion, which in the embodiments 500, 600 and 700, is provided by a unitary securing member, may be provided by the shell as opposed to the securing member. The securing member may also be formed of two or more components that are joined together. As such, for example, the securing member may be formed of an upper part with the central protrusion and a lower part that secures the retainer member to the shell. Engagement of the parts may be by way of complementary threaded portions or by an interference press fit. Provision of a two part securing member allows for a standard lower retaining part whilst the upper parts may be provided with differing central protrusions. The two part nature is indicated by dotted line 511 in FIG. 26.

Use of two or more components allows the use of a stepped aperture without the need for a rivet type arrangement.

The securing member is provided to secure the shell and the retainer member together. However, other methods to secure the two components together may be used that do not require a securing member passing into through an aperture in the shell.

The shell and retainer member may be secured together with spot welds. Where a central protrusion corresponding to those of the other embodiments is desired, it may be provided by a component separate from the shell that is connected to the shell, such as by threaded portions 81 and 812 on the shell and central protrusion respectively or an interference press fit. Alternatively the shell and central protrusion may be a single component.

Figure 38:
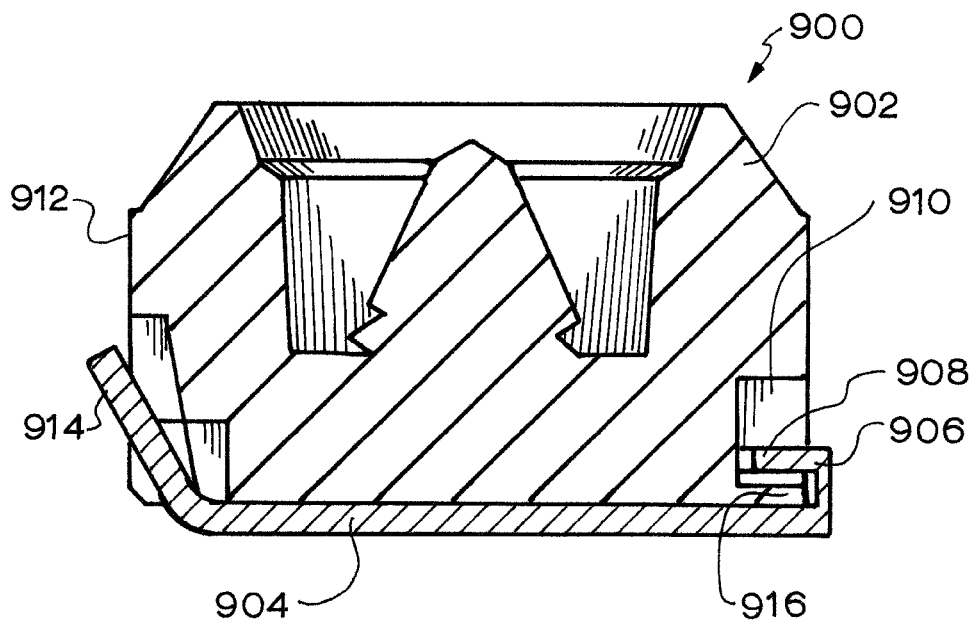
FIG. 38 is cross sectional side view of a security plug according to another embodiment of the invention.

FIG. 38 shows plug 900 with a shell 902 and a retainer member 904 with an integral securing member 906. The securing member 906 has three sprung/elastic legs 908 that engage in recesses 910 provided in the other three faces of the outer surface 912. Assembly of the shell 902 and a retainer member 904 together merely requires the integral retaining and securing member 904, 906 to be pressed against the shell 902 so as to deflect legs over the portion 916 of outer surface 912. Once the ends of the legs 908 pass the portion 916 they snap back into the recesses 910, securing the retainer member/securing member 904, 906 to the shell 902.

The sprung/elastic securing member may part of the retainer member, as in FIG. 38 but may be formed as a separate component that sandwiches the retaining member between itself and the shell The sprung/elastic securing member may be formed of a suitable metal or may be formed of a suitable plastics material. The force required to remove the securing member from the shell needs to be more than required to remove the plug from the socket.

In the embodiments described the shells are preferably formed of metal, more preferably stainless steel. Similarly the retaining members 502, 602, 702, 802 and 902 and securing members 504, 604, 704 804 and 904 are sloe preferably formed of metal, more preferably stainless steel. However the use or metal and more preferably stainless steel is not essential and other materials may be used. Thus, one or more of these components may be formed of other materials, such as suitable plastics.

Whilst the plugs 400, 600, 700, 800 and 900 all have the shell and retaining member as separate components that are secured together, it will be appreciated the shell and retaining member to be formed as a single component, particularly if formed from a suitable plastics material.

Figure 35:
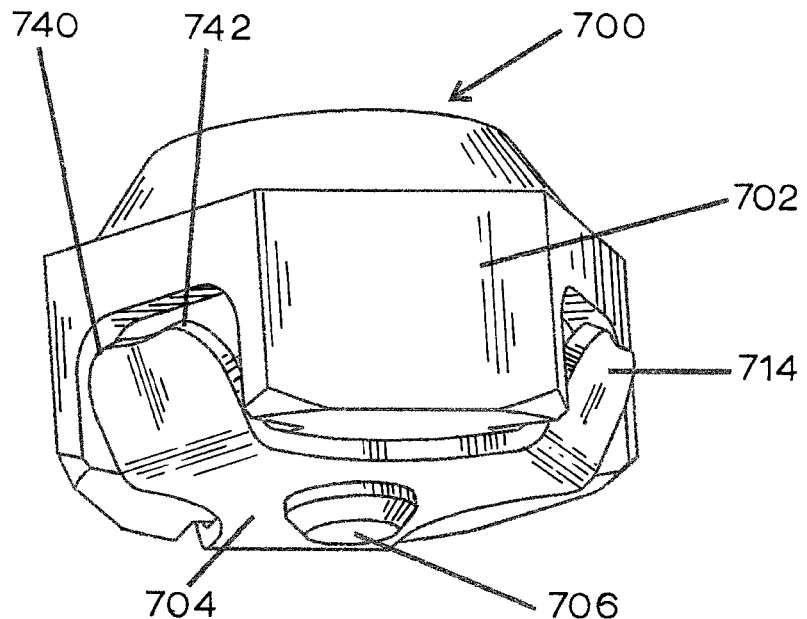
FIG. 35 is perspective view of a security plug according to another embodiment of the invention.
Figure 36:
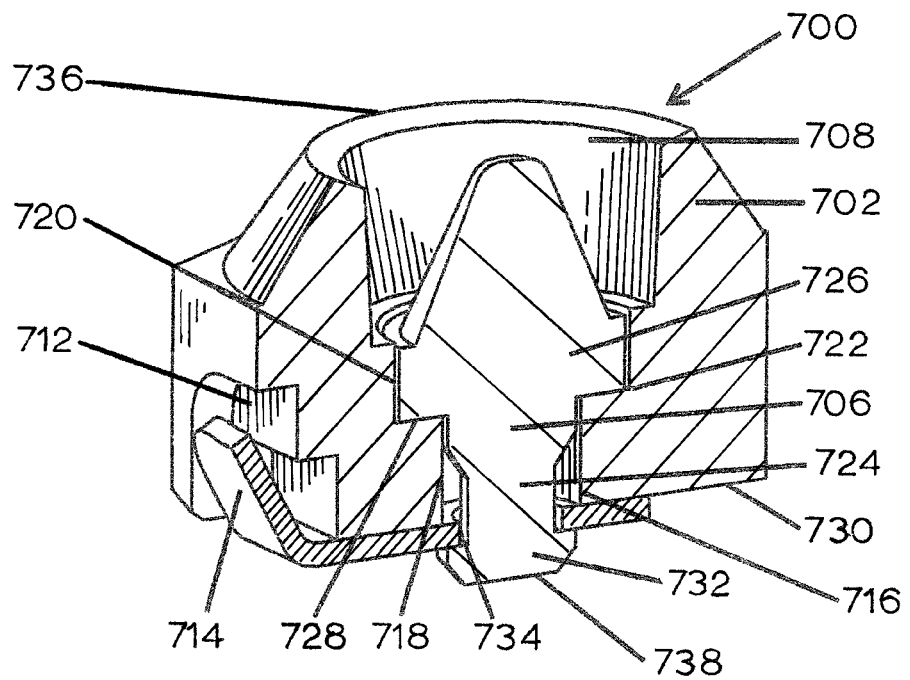
FIG. 36 is a cross sectional side view of the security plug of FIG. 35.

In the embodiments with the sprung retainer member the ends of the legs 518, 614, 714 may be varied so as to modify the engagement of the legs against the wall(s) of the socket. Legs 518 and 614 have relatively flat ends whilst the ends of legs 714 are concave. If desired the ends may be convex. Further, the ends may be asymmetric about the centreline of each leg. Referring to FIG. 35, the sides 740 and 742 may extend axially different amounts.

Figure 32:
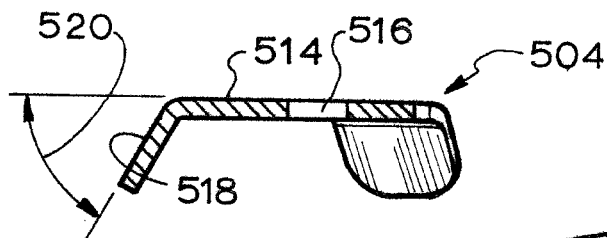
FIG. 32 is a cross sectional side view of the retainer member of the embodiment of FIG. 23 taken along line DQ-DQ in FIG. 31.
Figure 32B:
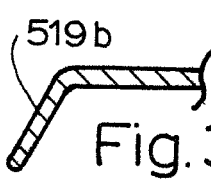
FIGS. 32*b* to 32*e* are cross sectional side views of variations of the legs of the retainer member of FIG. 29.

The ends of the legs may be modified so that the force applied to the walls of the socket by the legs does not prevent removal. The drawings show the ends of the legs being square and, referring to FIG. 32b, the ends 519b may be rounded.

Figure 32C:
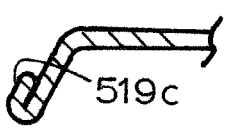
Figure 32D:
Figure 32E:
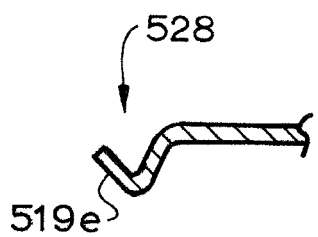

As shown in FIGS. 32c, 32d and 32e. The legs may be provided with end portion 519c that is rounded back on itself or an end portion 519d that extends generally parallel to the wall or an end portion 519e that extends outwardly and downwardly. The invention includes the leg 528 generally extending outwardly and downwardly, rather than just an end portion.

Unless the context clearly requires otherwise, throughout the description and any claims the words "comprise", "comprising", and the like are to be construed in an inclusive sense as opposed to an exclusive or exhaustive sense; that is to say, in the sense of "including, but not limited to".

The features of the invention described or mentioned in this document may be combined in any combination of features where features are not mutually exclusive.

It will be apparent to those skilled in the art that many obvious modifications and variations may be made to the embodiments described herein without departing from the spirit or scope of the invention.

I claim:

1. A security plug for a fastener having a longitudinally extending female socket adapted to receive a first tool, the plug adapted to be inserted into the female socket to prevent the first tool engaging in the female socket, the plug comprising:
    an outer surface portion complementary to the female socket;
    at least one retaining member for retaining the plug in the female socket, and
    at least one removal portion comprising at least one first engagement surface adapted to be engaged by a second tool having at least one second engagement surface complementary to the at least one first engagement surface, whereby mechanical engagement of the at least one first and second engagement surfaces provides engagement between the second tool and the plug to allow force applied longitudinally by the second tool on the plug to withdraw the plug from the female socket against the action of the at least one retaining member,
    wherein at least one first engagement surface has a self-holding taper has an included taper angle between 1 and 10 degrees.

2. A security plug of claim 1 wherein a self-holding taper comprises a Morse taper, a Brown Et Sharpe taper, a Jacobs taper or a Jarno taper.

3. A security plug of claim 1 wherein one of the first and second engagement surfaces comprises a female engagement surface and the other of the first and second engagement surfaces comprises a male engagement surface adapted to be received within the female engagement surface and wherein, when the first and second engagement surfaces are engaged together, the male engagement surface expands the female engagement surface very slightly and the resulting compressive forces applied by the female engagement surface to the male engagement surface over the overlapping regions of male and female surfaces hold the security plug and the second tool together.

4. A security plug of claim 1 wherein the plug has first and second longitudinal ends and the at least one removal portion is located at or adjacent the first longitudinal end and the at least one retaining member is located at or adjacent the second longitudinal end, the plug adapted to be inserted into the female socket with the at least one retaining member engaging an inner end of the female socket or at least one side wall of the female socket.

5. A security plug of claim 4 wherein the retainer comprises at least one leg biased to engage the at least one side wall.

6. A security plug of claim 5 wherein the at least one leg extends outwardly toward the first longitudinal end.

7. A security plug of claim 5 comprising at least one leg receiving recess for receiving the at least one leg.

8. A security plug of claim 5 wherein the at least one leg extends at an angle to the longitudinal direction of between 10 and 40 degrees.

9. A security plug of claim 5 wherein the at least one leg extends at an angle to the longitudinal direction of between 20 and 30 degrees.

10. A security plug of claim 5 wherein the at least one leg extends at an angle to the longitudinal direction of about 21 degrees.

11. A security plug of claim 1 wherein the plug is integrally formed with the retainer member.

12. A security plug of claim 1 comprising a shell and a separate retainer member connected to the shell.

13. A security plug of claim 12 wherein the retainer member is connected to the shell by at least one of adhesive, glue, bonding agent, weld, rivet, bolt, screw, interference fit pin, clip, circlip and biased arm(s).

14. A security plug of claim 12 comprising at least one securing member that engages the shell to secure the retaining member to the shell.

15. A security plug of claim 14 wherein the at least one securing member engages a peripheral surface of the shell.

16. A security plug of claim 14 wherein the retainer member comprises the at least one securing member.

17. A security plug of claim 14 wherein the retainer member and the at least one securing member are separate components.

18. A security plug of claim 17 wherein the at least one securing member passes through the retainer member to engage the shell and secure the retainer member to the shell.

19. A security plug of claim 18 wherein the shell comprises at least one further recess or bore and the at least one securing member is received in the at least one further recess or bore.

20. A security plug of claim 19 wherein the at least one further recess or bore and the at least one securing member have complementary threads and the at least one securing member screws into the shell.

21. A security plug of claim 19 wherein the at least one further recess or bore and the at least one securing member are an interference fit.

22. A security plug of claim 19 comprising at least one longitudinally extending first recess comprising said at least one first engagement surface and the at least one further recess or bore extends to the first recess.

23. A security plug of claim 19 wherein the at least one bore is a blind bore.

24. A security plug of claim 17 comprising at least one head and the retaining member is sandwiched between the shell and the at least one head.

25. A security plug of claim 24 wherein the at least one head engages the at least one securing member.

26. A security plug of claim 24 wherein the at least one head comprises a clip, including a circlip.

27. A security plug of claim 14 wherein the at least one head is integral with the at least one securing member.

\* \* \* \* \*